(12) United States Patent
Echizen et al.

(10) Patent No.: US 11,658,536 B2
(45) Date of Patent: May 23, 2023

(54) ROTARY ELECTRIC MACHINE

(71) Applicant: DENSO CORPORATION, Kariya (JP)

(72) Inventors: Masayuki Echizen, Kariya (JP); Seigo Shinoda, Kariya (JP)

(73) Assignee: DENSO CORPORATION, Kariya (JP)

( * ) Notice: Subject to any disclaimer, the term of this patent is extended or adjusted under 35 U.S.C. 154(b) by 399 days.

(21) Appl. No.: 16/892,656

(22) Filed: Jun. 4, 2020

(65) Prior Publication Data
US 2021/0384790 A1  Dec. 9, 2021

(51) Int. Cl.
  *H02K 1/27* (2022.01)
  *H02K 3/52* (2006.01)
  *H02K 3/28* (2006.01)
  *H02K 1/14* (2006.01)

(52) U.S. Cl.
  CPC ............ *H02K 3/522* (2013.01); *H02K 1/148* (2013.01); *H02K 1/27* (2013.01); *H02K 3/28* (2013.01); *H02K 2203/06* (2013.01); *H02K 2203/12* (2013.01)

(58) Field of Classification Search
  CPC .. H02K 2203/06; H02K 2203/12; H02K 3/28; H02K 3/522; H02K 1/27; H02K 1/148
  See application file for complete search history.

(56) References Cited

U.S. PATENT DOCUMENTS

| 2006/0214529 A1 | 9/2006 | Nishino et al. | |
| 2007/0182265 A1* | 8/2007 | Makino | H02K 3/522 310/179 |
| 2015/0042180 A1* | 2/2015 | Kuroiwa | H02K 3/345 310/43 |

FOREIGN PATENT DOCUMENTS

| EP | 2 940 834 A2 | 11/2015 |
| JP | 2010-239695 A | 10/2010 |

OTHER PUBLICATIONS

U.S. Appl. No. 16/892,528, filed Jun. 4, 2020 in the name of Echizen et al.
U.S. Appl. No. 18/074,124, filed Dec. 2, 2022 in the name of Echizen et al.

* cited by examiner

Primary Examiner — Bryan R Perez
(74) Attorney, Agent, or Firm — Oliff PLC

(57) ABSTRACT

A rotary electric machine includes a multi-phase winding including magnetic poles circumferentially arranged in a circumferential direction. The multi-phase winding includes crossover wires each connecting two same-phase single coils that provide same-phase magnetic poles of the magnetic poles. The crossover wire includes an inter-pole crossover wire and an end crossover wire. The inter-pole crossover wire extends between one end and another end of the multi-phase winding in an axial direction of the multi-phase winding. The inter-pole crossover wire extends through an inter-pole gap between two adjacent poles of the magnetic poles. The end crossover wire extends in the circumferential direction on the other end of the multi-phase winding.

11 Claims, 12 Drawing Sheets

ROTARY ELECTRIC MACHINE

CROSS REFERENCE TO RELATED APPLICATION

This application is based on and incorporates herein by reference Japanese Patent Application No. 2018-233635 filed on Dec. 13, 2018.

TECHNICAL FIELD

The disclosure in this specification relates to a rotary electric machine.

BACKGROUND

Conventionally, a rotary electric machine including multiple magnetic poles is known.

SUMMARY

According to at least one embodiment, a rotary electric machine includes a multi-phase winding including magnetic poles circumferentially arranged in a circumferential direction. The multi-phase winding includes crossover wires. Each crossover sire connects two same-phase single coils that provide same-phase magnetic poles of the magnetic poles. The crossover wire includes an inter-pole crossover wire and an end crossover wire. The inter-pole crossover wire extends between one end and another end of the multi-phase winding in an axial direction of the multi-phase winding. The inter-pole crossover wire extends through an inter-pole gap between two adjacent poles of the magnetic poles. The end crossover wire extends in the circumferential direction on the other end of the multi-phase winding.

BRIEF DESCRIPTION OF THE DRAWINGS

The details of one or more embodiments are set forth in the accompanying drawings and the description below. Other features and advantages will be apparent from the description and drawings, and from the claims.

DETAILED DESCRIPTION

Figure 1:
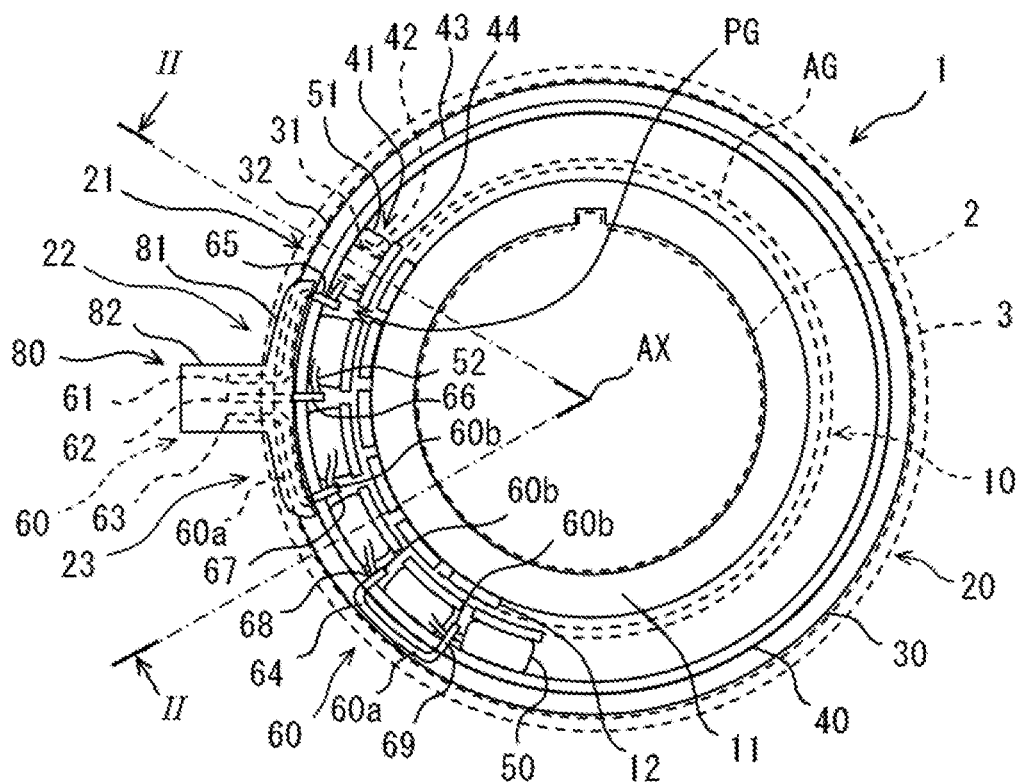
FIG. 1 is a plan view showing a rotary electric machine according to a first embodiment.

A comparative example will be described. According to the comparative example, crossover wires of a stator core are arranged in a stack along an insulator of a stator.

According to the comparative example, a size of the rotary electric machine in the axial direction may be large.

According to an aspect of the present disclosure, a rotary electric machine includes a multi-phase winding including magnetic poles circumferentially arranged in a circumferential direction. The multi-phase winding includes crossover wires. Each crossover wire connects two same-phase single coils that provide same-phase magnetic poles of the magnetic poles. The crossover wire includes an inter-pole crossover wire and an end crossover wire. The inter-pole crossover wire extends between one end and another end of the multi-phase winding in an axial direction of the multi-phase winding. The inter-pole crossover wire extends through an inter-pole gap between two adjacent poles of the magnetic poles. The end crossover wire extends in the circumferential direction on the other end of the multi-phase winding.

According to the disclosed rotary electric machine, the crossover wire connecting the two same-phase single coils includes the inter-pole crossover wire as a part thereof. The inter-pole crossover wire extends between the one end and the other end in the axial direction through the inter-pole gap which is between two magnetic poles adjacent to each other in the circumferential direction. Since the inter-pole crossover wire provides a part of the crossover wire, a length of the end crossover wire can be reduced. As a result, the number of the end crossover wires of different phases can be reduced, and a compact rotary electric machine 1 can be provided.

Hereinafter, a plurality of embodiments will be described with reference to the drawings. In some embodiments, parts which are functionally and/or structurally corresponding and/or associated are given the same reference numerals, or reference numerals with different hundreds digit or higher digits. For corresponding parts and/or associated parts, additional explanations can be made to the description of other embodiments. The contents of US 2007/0182265 A1 is incorporated by reference as explanation of technical elements in this specification.

First Embodiment

Figure 2:
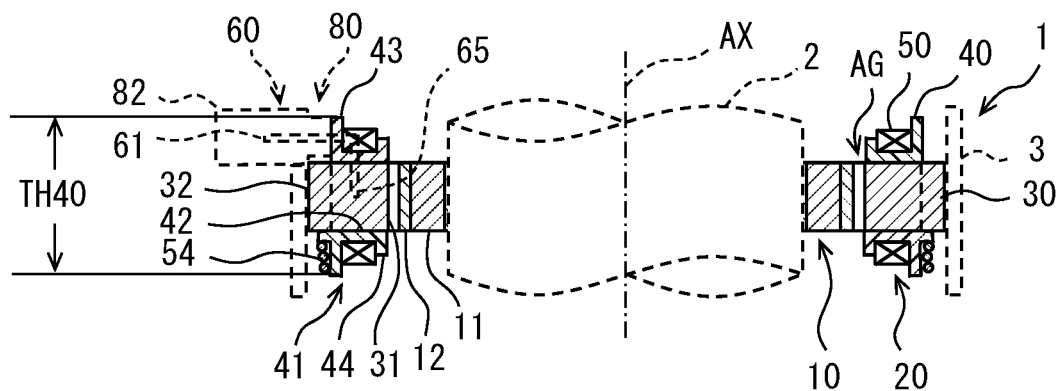
FIG. 2 is a cross-sectional view taken along a line II-II of FIG. 1.

FIGS. 1 and 2 show a rotary electric machine 1. In FIGS. 1 and 2, the rotary electric machine 1 is illustrated in a slightly exaggerated manner in radial direction. Dash lines indicate omissions or hidden lines. The rotary electric machine 1 is configured to rotate around a rotation axis AX. In the following descriptions, a direction in which the rotation axis AX extends is called an axial direction, a circumference around the rotation axis AX is called a circumferential direction, and a radiation direction centered at the rotation axis AX is called a radial direction.

In FIG. 1, the rotary electric machine 1 is coupled to a rotary body 2. The rotary body 2 is configured to rotate around the rotation axis AX. The rotary body 2 is a rotary shaft or an input/output end of a transmission. The rotary electric machine 1 is housed in a housing 3. The housing 3 provides a fixation portion for the rotating rotary electric machine 1.

The rotary electric machine 1 has a rotor 10 and a stator 20. The rotary electric machine 1 is an inner rotor type. The rotor 10 and the stator 20 are arranged so as to form an air gap AG therebetween. The rotor 10 is disposed outward of the rotary body 2 in the radial direction. The stator 20 is disposed further outward of the rotor 10 in the radial direction.

The rotor 10 includes a rotor core 11 and multiple rotor magnetic poles 12. The rotor core 11 is an annular magnetic body. The rotor core 11 is connected to the rotary body 2 in the rotation direction. The multiple rotor magnetic poles 12 are provided by permanent magnets. The multiple rotor magnetic poles 12 are arranged at equal intervals on an outer circumferential surface of the rotor core 11. As a result, the rotor 10 provides a permanent magnet rotor.

The stator 20 includes a stator core 30, an insulator 40 attached to the stator core 30, and a coil 50 attached to the insulator 40. The stator 20 provides multiple stator magnetic poles. In this embodiment, the stator 20 provides eighteen stator magnetic poles. In the drawings, a stator magnetic pole 21, a stator magnetic pole 22, and a stator magnetic pole 23 are illustrated for example. Each of these three stator magnetic poles 21, 22, 23 includes a corresponding phase winding. One stator magnetic pole includes one tooth 31, one bobbin 41 and one single coil 51.

These multiple stator magnetic poles define an inter-pole gap PG between two stator magnetic poles that are next to each other in the circumferential direction. The inter-pole gap PG is also called a circumferential gap or an inter-coil gap. The multiple inter-pole gaps PG have equal predetermined widths in the circumferential direction. The multiple inter-pole gaps PG are disposed at equal intervals in the circumferential direction. The inter-pole gap PG has a size that allows a connection portion described later to be arranged therein. The inter-pole gap PG has a size that allows a manufacturing operation for forming and arranging the connection portion to be performed. The size of the inter-pole gap PG can secure electrical insulation necessary as the rotary electric machine 1 between the connection portion described later and the coil 50.

The stator core 30 is, for example, a laminated body of electrical steel sheets. The stator core 30 includes multiple teeth 31. The stator core 30 includes a yoke 32. The yoke 32 is an annular magnetic body. The yoke 32 connects the multiple teeth 31 magnetically and mechanically. The multiple teeth 31 are arranged at equal intervals on an inner circumferential surface of the yoke 32. The multiple teeth 31 and the annular yoke 32 are a continuous body.

The insulator 40 is made of electrically insulating resin. The insulator 40 is a resin molded body. The insulator 40 includes multiple divided bodies divided in the axial direction. The multiple divided bodies are attached to the stator core 30 such that the insulator 40 is provided. The insulator 40 provides multiple bobbins 41 for the multiple teeth 31. One bobbin 41 is formed on one tooth 31. The bobbin 41 provides a winding drum for the coil 50. One bobbin 41 has a tubular portion 42 located radially outward of one tooth 31. One bobbin 41 provides a base end flange 43 at a base end of the tooth 31 and a top end flange 44 at a top end of the tooth 31. In other words, the tubular portion 42, the base end flange 43, and the top end flange 44 provide one bobbin 41.

The coil 50 provides a stator winding. The coil 50 provides a multi-phase winding. In this embodiment, the coil 50 provides a three phase winding. The insulator 40 is arranged between the coil 50 and the stator core 30. The coil 50 is arranged radially outward of the multiple teeth 31. The coil 50 includes multiple single coils 51. One single coil 51 is arranged radially outward of one tooth 31. The multiple single coils 51 are formed by winding wires around the bobbins 41. The wires are single wires made of copper or copper alloy. The wires have flexibility to allow winding work.

The stator magnetic pole 21 provides one phase winding of the three phase winding, for example, a U-phase winding. The stator magnetic pole 22 provides another phase winding of the three phase winding, for example, a V-phase winding. The stator magnetic pole 23 provides the remaining phase winding of the three phase winding, for example, a W-phase winding.

The stator 20 includes at least one conductive member 60. The stator 20 includes multiple conductive members 60. The conductive member 60 is also called a bus bar. The conductive member 60 has a cross-sectional shape different from that of the wire forming the coil 50. The wire has a circular cross section, but the conductive member 60 has a rectangular or square cross section. The conductive member 60 has flexibility. The flexibility of the conductive member 60 is lower than the flexibility of the wire. The conductive member 60 is harder and less likely to be deformed than the wire. Therefore, the conductive member 60 is a conductive member for electrically pulling out the wire of the coil 50 from the single coil 51.

The multiple conductive members 60 include power end members 61, 62, 63 and a neutral point member 64. The power end members 61, 62, 63 provide output terminals or input terminals as the three-phase winding. When the rotary electric machine 1 functions as a generator, the power end members 61, 62, 63 provide output terminals. When the rotary electric machine 1 functions as an electric motor, the power end members 61, 62, 63 provide input terminals. In this embodiment, the power end members 61, 62, 63 provide terminals of an electrical connector. The neutral point member 64 provides a neutral point connection as the three phase winding.

One conductive member 60 has at least one connection portion 65, 66, 67, 68, 69. The conductive member 60 is electrically and mechanically connected to at least one coil end 52 at the connection portion 65, 66, 67, 68, 69. The coil end 52 is an end portion of the coil 50. The stator 20 includes multiple coil ends 52. If the coil 50 provides a three-phase winding, the stator 20 has, for example, six coil ends 52.

The multiple power end members 61, 62, 63, respectively, have multiple connection portions 65, 66, 67 which are arranged, respectively, in three inter-pole gaps PG next to each other. The power end member 61 has a connection portion 65 arranged in a first inter-pole gap PG. The power end member 62 has a connection portion 66 arranged in a second inter-pole gap PG. The power end member 63 has a connection portion 67 arranged in a third inter-pole gap PG. The first to third inter-pole gaps PG are arranged next to each other. Each of the multiple connection portions 65, 66 and 67 is connected to a smallest number of coil ends 52. The smallest number is a number of a parallel number in the coil 50. In this embodiment, the smallest number is 1. When the coil 50 is provided by two parallel coils, the smallest number is 2.

The neutral point member 64 has multiple connection portions 68, 69 which are arranged, respectively, in the multiple inter-pole gaps PG next to each other. In an example illustrated in the drawings, the neutral point member 64 has two connection portions 68, 69 which are arranged, respectively, in two inter-pole gaps PG next to each other. The connection portion 68 is connected to the smallest number of coil ends 52. The connection portion 69 is connected to twice the smallest number of coil ends 52.

The multiple connection portions 65, 66, 67, 68, 69 are dispersively arranged in the multiple inter-pole gaps PG next to each other. The multiple connection portions 65, 66, 67, 68, 69 are arranged in the multiple inter-pole gaps PG next to each other, in a one-to-one relationship therebetween. In this embodiment, one connection portion is arranged in one inter-pole gap PG. As a result, the five connection portions 65, 66, 67, 68, 69 are arranged in the five inter-pole gaps PG next to each other.

The connection portions 65, 66, 67, 68, 69 are positioned in the inter-pole gaps PG. The connection portions 65, 66, 67, 68, 69 are positioned in the inter-pole gaps PG in the axial direction. A part of the conductive member 60 may extend out of the inter-pole gap PG in the axial direction. However, the connection portions 65, 66, 67, 68, 69 are entirely arranged in the inter-pole gaps PG. The connection portions 65, 66, 67, 68, 69 are positioned in the inter-pole gaps PG in the radial direction. A part of the conductive member 60 may extend out of the inter-pole gap PG in the radial direction. However, the connection portions 65, 66, 67, 68, 69 are entirely arranged in the inter-pole gaps PG.

Multiple magnetic poles protrude in the radial direction from the yoke 32 that extends in the circumferential direction. The multiple conductive members 60 include a circumferential extending portion 60a and a radial extending portion 60b. The circumferential extending portion 60a extends in the circumferential direction along the yoke 32. The radial extending portion 60b extends in the radial direction from the circumferential extending portion, and an end of the radial extending portion 60b reaches the inter-pole gap PG. The connection portions 65, 66, 67, 68, 69 are formed on the end of the radial extending portion 60b. For example, the power end members 61, 63 have the circumferential extending portion 60a and the radial extending portion 60b. The power end member 62 includes only the radial extending portion 60b. The power end members 61, 62, 63 include a radial extending portion extending inward toward the inter-pole gap PG for the connection portion, and a radial extending portion extending outward to be connected to an external circuit for external connection. The neutral point member 64 includes a circumferential extending portion 60a and two radial extending portions 60b.

The stator 20 includes a terminal block 80. The terminal block 80 is made of an electrically insulating resin. The terminal block 80 supports the multiple conductive members 60. The terminal block 80 supports the multiple power end members 61, 62, 63. The multiple power end members 61, 62, 63 are insert-molded on the terminal block 80. The terminal block 80 has a body portion 81 and a connector portion 82. The body portion 81 extends in an arc shape along the stator 20. The connector portion 82 is located outward of the body portion 81 in the radial direction and extends outward from the body portion 81 in the radial direction. The connector portion 82 is connected to a connector of an external circuit. The connector portion 82 provides a connection between the power end members 61, 62, 63 and the external circuit. The external circuit provides a control circuit for the rotary electric machine 1. The terminal block 80 is fixed to the stator 20. Specifically, the terminal block 80 is fixed to the insulator 40. The neutral point member 64 is supported by the insulator 40.

FIG. 2 shows a cross section taken along line II-II in FIG. 1. In this drawing, the position of the power end member 61 in the multiple conductive members 60 is illustrated by a relative positional relationship with the multiple stator magnetic poles. The multiple conductive members 60 are arranged similarly to the illustrated one. The drawing illustrates a crossover wire 54. The arrangement and the number of the crossover wires 54 are merely examples. Arrangement and the number of the multiple crossover wires 54 are shown in winding diagrams described later.

The multiple magnetic poles 21, 22, 23 include the insulator 40 as the bobbins 41. A height TH40 of the insulator 40 in the axial direction of the rotary electric machine 1 defines a height of the stator 20. In other words, the height TH40 of the insulator 40 defines a height of the rotary electric machine 1. The multiple conductive members 60 are arranged within the height TH40 of the insulator 40 in the axial direction.

The coil 50 includes the crossover wire 54 extending over the multiple single coils 51. The crossover wire 54 connects the multiple single coils 51 belonging to one phase winding by a continuous wire. In other words, the crossover wire 54 connects the multiple stator magnetic poles in the same phase by the continuous wire. In the case of three-phase winding, for example, the multiple single coils 51 belonging to the same phase, such as No. 1, No. 4, No. 7 . . . , are connected. The crossover wire 54 is laid along the insulator 40. The crossover wire 54 extends at least partially on an outer side of the base end flange 43 in the radial direction. The crossover wire 54 extends at least partially on an end portion in the axial direction which is opposite to an end portion in the axial direction where the terminal block 80 is arranged.

The power end member 61 extends in the radial direction in the connector portion 82 for external connection. The power end member 61 extends along the circumferential direction on the outer side of the base end flange 43 in the radial direction. The power end member 61 has a corner on an outer side of the first inter-pole gap PG in the radial direction. The power end member 61 extends across the base end flange 43 in the radial direction on the outer side of the first inter-pole gap PG in the radial direction. The power end member 61 extends in the first inter-pole gap PG in the axial direction. The connection portion 65 is positioned in the first inter-pole gaps PG. The connection portions 65 is positioned at the substantially center of the inter-pole gaps PG in the axial direction. The connection portions 65 is positioned at the substantially center of the inter-pole gaps PG in the radial direction.

The terminal block 80 is located outward of the base end flange 43 in the radial direction. The terminal block 80 is arranged at only one of opposite end portions of the rotary electric machine 1 in the axial direction. The connector portion 82 is located outward of the base end flange 43 in the radial direction. The connector portion 82 is exposed to an outside of the housing 3. The connector portion 82 has an opening facing outward in the radial direction in the outside of the housing 3. The connector portion 82 forms an electrical connection via the power end member 61 by receiving a connector of the external circuit moved along the radial direction from the outside in the radial direction.

Figure 3:
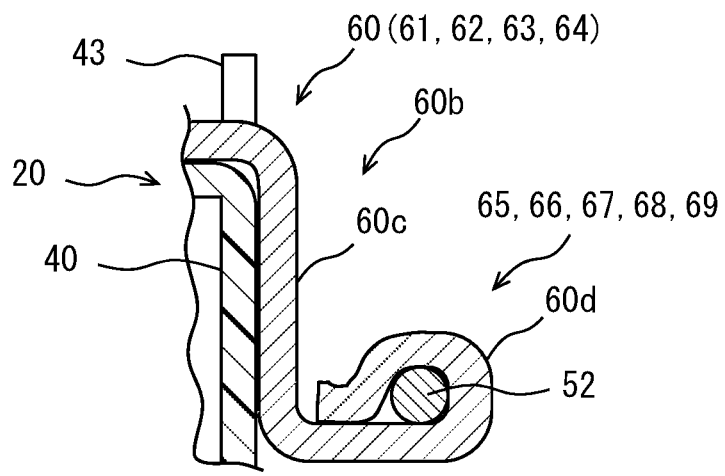
FIG. 3 is a cross-sectional view showing a connection portion of a conductive member.

FIG. 3 is an enlarged view of the connection portion in FIG. 2. The multiple conductive members 60, that is, the multiple power end members 61, 62, 63 and the neutral point member 64 have similar shapes in the connection portions

65, 66, 67, 68, 69 provided by them. The conductive member 60 has a curved portion 60c and a joint portion 60d in the radial extending portion 60b. The curved portion 60c is a crank type that extends from an end surface of the stator 20 in the axial direction along a surface of the insulator 40 and further extends toward the inter-pole gap PG. The connection between the conductive member 60 and the coil end 52 is provided by fusing. The joint portion 60d that provides the connection by fusing is provided by the conductive member 60 being bent so as to wrap the coil end 52. The conductive member 60 and the coil end 52 are electrically and mechanically connected by fusing processing.

Figure 4:
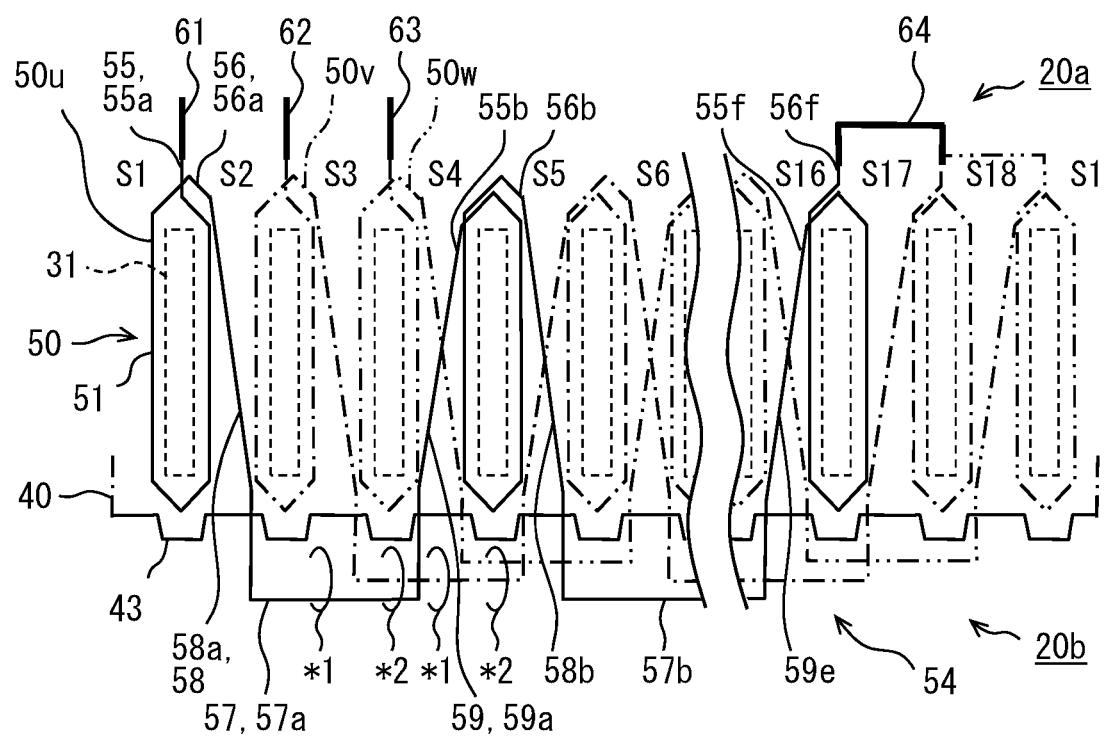
FIG. 4 is a winding diagram of a stator.
Figure 5:
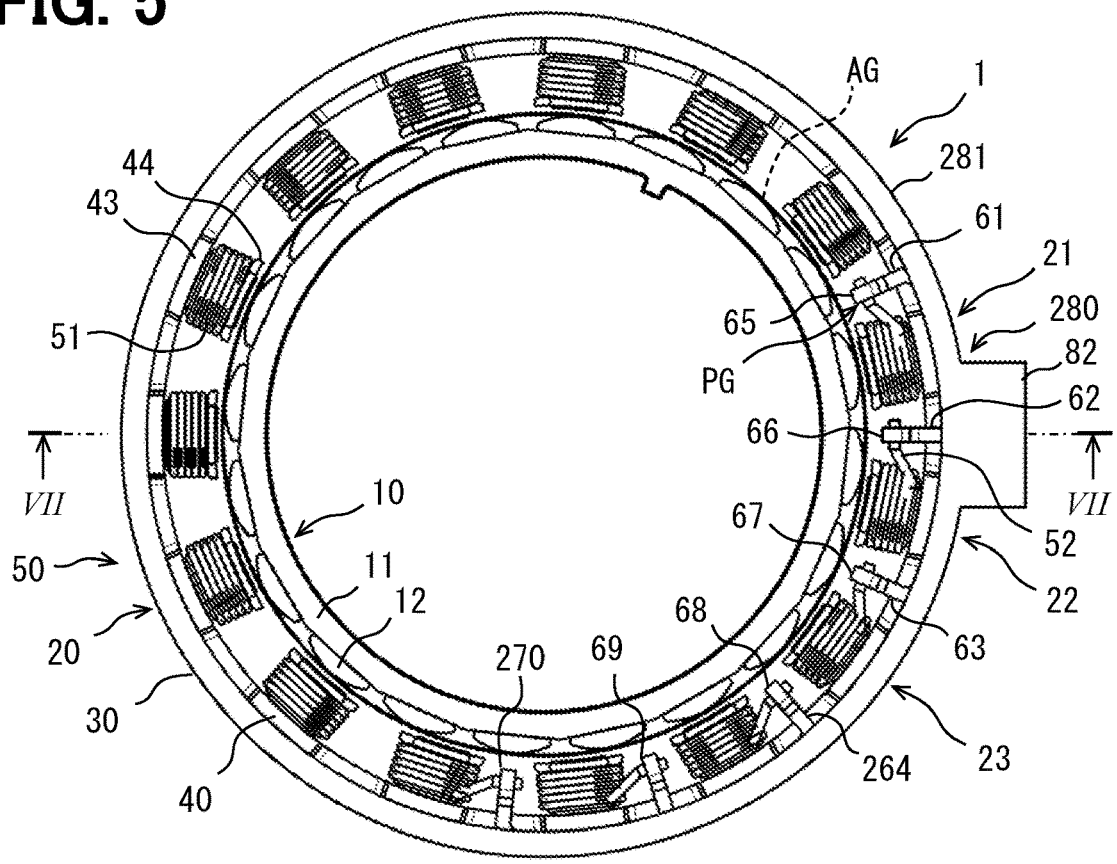
FIG. 5 is a plan view showing a rotary electric machine according to a second embodiment.
Figure 6:
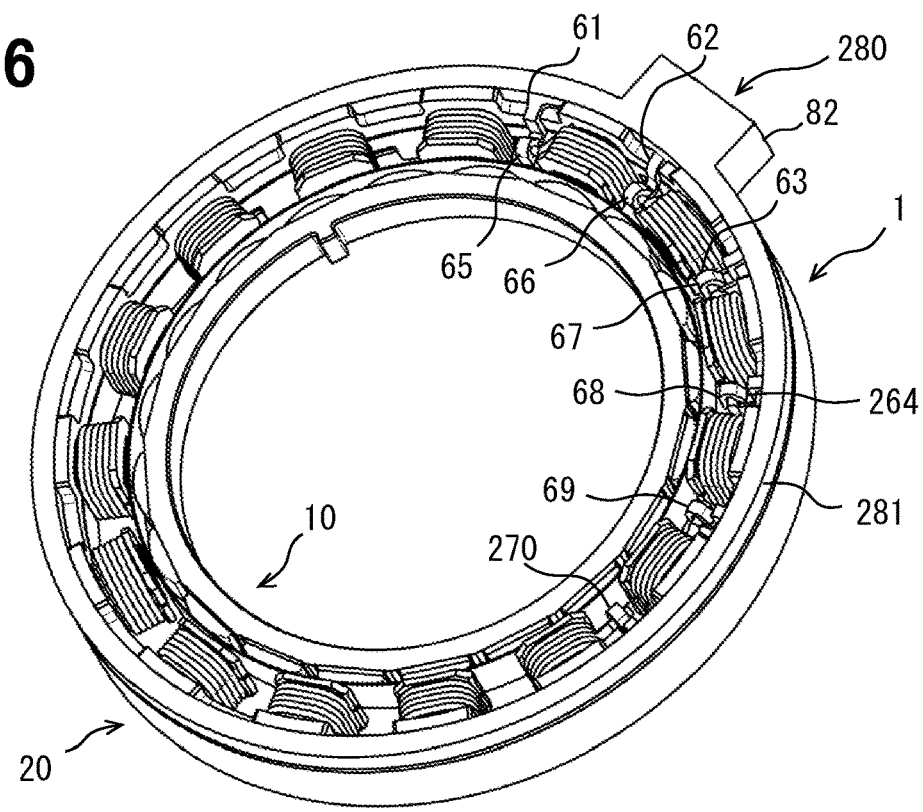
FIG. 6 is a perspective view showing a rotary electric machine.
Figure 7:
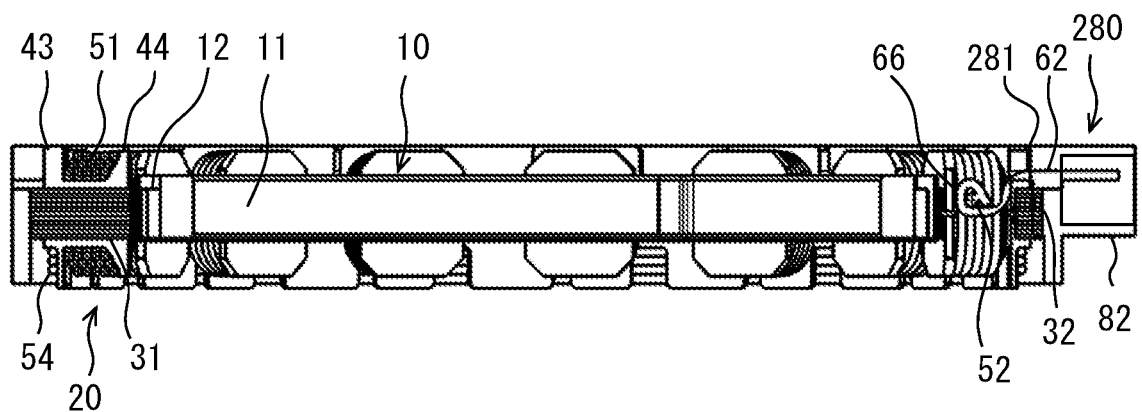
FIG. 7 is a cross-sectional view on a line VII-VII in FIG. 5.
Figure 8:
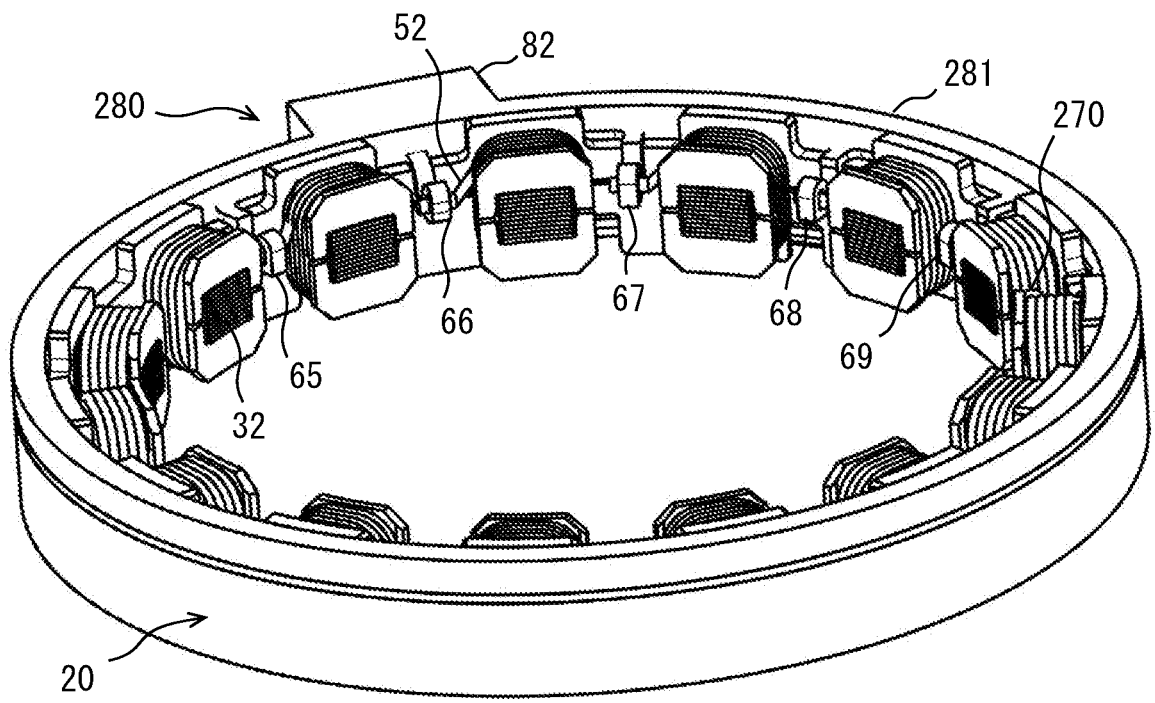
FIG. 8 is a perspective view showing a stator.

FIG. 4 is a winding diagram showing a circuit of the coil 50 in the rotary electric machine 1. The rotary electric machine 1 provides a multi-phase winding with multiple magnetic poles arranged in the circumferential direction. The coil 50 is illustrated as viewed from an inside of the stator 20. In the figure, slots S7 to S15 which are repeated parts are omitted. The coil 50 includes multiple phase windings. The coil 50 includes a U-phase winding 50u, a V-phase winding 50v, and a W-phase winding 50w. The coil 50 is wound such that the single coil 51 of the U-phase winding 50u, the single coil 51 of the V-phase winding 50v, and the single coil 51 of the W-phase winding 50w are alternately formed. In this embodiment, eighteen magnetic poles are formed, and eighteen slots S1 to S18 are formed between the multiple magnetic poles. The slots S1 to S18 correspond to the inter-pole gaps PG. The stator 20 has one end 20a and another end 20b in the axial direction. The one end 20a is an end portion where the conductive member 60 is arranged. The other end 20b is an end portion where an end crossover wire 57 is arranged.

The coil 50 is wound from a predetermined first magnetic pole. When winding of the single coil 51 in the first magnetic pole is completed, the winding of the coil 50 is moved to the next magnetic pole of the same phase through the crossover wire 54 and performed on this magnetic pole. Therefore, the crossover wire 54 extends between the two single coils 51 that provide the same-phase magnetic poles. The crossover wire 54 is also called a jumper wire. The coil 50 is wound on the multiple magnetic poles in sequence. In the following descriptions, the first magnetic pole will be called No. 1. Due to this winding process, a winding start portion 55 and a winding finish portion 56 of one single coil 51 in one magnetic pole can be specified. The crossover wire 54 includes the end crossover wire 57, an inter-pole crossover wire 58, and an inter-pole crossover wire 59.

The end crossover wire 57 is arranged on the other end 20b of the stator 20, i.e. the rotary electric machine 1. In other words, the end crossover wire 57 is arranged on the end (the other end 20b) opposite from the end (the one end 20a) where the conductive member 60 is arranged. The end crossover wire 57 extends in the circumferential direction on the other end 20b. The end crossover wire 57 extends along the circumferential direction over lengths of at least two single coils 51 and one slot.

The inter-pole crossover wire 58 is arranged between the winding finish portion 56 and the end crossover wire 57. The inter-pole crossover wire 58 is located before the end crossover wire 57 in the winding process, and is therefore also called a front crossover wire. The inter-pole crossover wire 58 connects between the one end 20a and the other end 20b in the axial direction through the inter-pole gap PG which is between the different-phase two single coils 51 separated in the circumferential direction. The inter-pole crossover wire 58 extends between the one end 20a and the other end 20b in the axial direction through the inter-pole gap PG which is between two magnetic poles adjacent to each other in the circumferential direction.

The inter-pole crossover wire 59 is arranged between the end crossover wire 57 and the winding start portion 55. The inter-pole crossover wire 59 is located after the end crossover wire 57 in the winding process, and is therefore also called a rear crossover wire. The inter-pole crossover wire 59 connects between the one end 20a and the other end 20b in the axial direction through the inter-pole gap PG which is between the different-phase two single coils 51 separated in the circumferential direction. The inter-pole crossover wire 59 extends between the one end 20a and the other end 20b in the axial direction through the inter-pole gap PG which is between two magnetic poles adjacent to each other in the circumferential direction.

In the drawings and the descriptions, the end crossover wire 57, the winding start portion 55, the winding finish portion 56, the inter-pole crossover wire 58, and the inter-pole crossover wire 59 are assigned identification symbols such as a, b . . . to be identified. The identification symbols such as a, b, . . . correspond to repetition of windings in the winding process. For example, winding of the U-phase winding 50u starts from a first winding start portion 55a and ends at a last winding finish portion 56f. The details of the U-phase winding 50u will be described below. The V-phase winding 50v and the W-phase winding 50w have the similar shape.

With respect to the U-phase winding 50u, winding of the magnetic pole No. 1 starts from the winding start portion 55a and ends at a winding finish portion 56a. In this embodiment, the single coil 51 is wound in a clockwise direction. Alternatively, the single coil 51 may be wound in a counterclockwise direction. In this embodiment, the winding process proceeds rightward from the magnetic pole No. 1. Alternatively, the winding process may proceed leftward from the magnetic pole No. 1.

The single coil 51 has wires that is laminated in several layers in a radial direction of the magnetic pole. The number of layers in the single coil 51 is more than or equal to two, and less than or equal to ten. Preferably, the number of layers in the single coil 51 is more than or equal to two, and less than or equal to seven. In this embodiment, the number of layers in the single coil 51 is more than or equal to two, and less than or equal to five. Specifically, the single coil 51 has three layers. This number of layers defines heights of the base end flange 43 and the top end flange 44. As a result, the number of layers defines the height TH40 of the insulator 40, and consequently defines the height of the rotary electric machine 1. The number of layers in the single coil 51 is more than or equal to two even in regular winding or random winding. The winding diagram schematically illustrates the single coil 51, and the number of turns and the number of layers are omitted. The single coil 51 is arranged inside the stator 20, that is, on an inner circumferential surface of the stator 20.

The U-phase winding 50u connects from a winding finish portion 56a through an inter-pole crossover wire 58a to an end crossover wire 57a. The winding start portion 55a is arranged on the one end 20a. The end crossover wire 57a is arranged on the other end 20b, i.e., an end portion opposite from the conductive member 60. The multiple conductive members 60 are intensively arranged on the one end 20a of the stator 20 in the axial direction, and the multiple end crossover wires 57 are intensively arranged on the other end 20b of the stator 20 in the axial direction. As a result, the both ends of the stator 20 can be effectively used.

The U-phase winding 50*u* is continuous from the winding finish portion 56*a* to the inter-pole crossover wire 58*a*. The inter-pole crossover wire 58*a* extends from the one end 20*a* to the other end 20*b*. The inter-pole crossover wire 58*a* extends in the axial direction within the slot S2. The inter-pole crossover wire 58*a* extends in the circumferential direction within the slot S2. Thus, the inter-pole crossover wire 58*a* extends obliquely within the slot S2. The inter-pole crossover wire 58*a* is arranged inside the stator 20. The inter-pole crossover wire 58*a* is arranged in the inter-pole gap PG. The inter-pole crossover wire 58*a* also functions imperfectly as a part of the single coil 51 in the magnetic pole No. 1.

The U-phase winding 50*u* is continuous from the inter-pole crossover wire 58*a* to the end crossover wire 57*a*. The end crossover wire 57*a* extends in the circumferential direction. The end crossover wire 57*a* is arranged so as to extend along the circumferential direction of the stator 20. The end crossover wire 57*a* is arranged along the base end flange 43. The end crossover wire 57*a* is arranged outside the stator 20. The base end flange 43 functions as a stopper that holds the end crossover wire 57*a*. A circumferential edge of the base end flange 43 defines a boundary between the inter-pole crossover wire 58*a* and the end crossover wire 57*a*.

The U-phase winding 50*u* is continuous from the end crossover wire 57*a* to an inter-pole crossover wire 59*a*. The inter-pole crossover wire 59*a* extends from the other end 20*b* to the one end 20*a*. The inter-pole crossover wire 59*a* extends in the axial direction within the slot S4. The inter-pole crossover wire 59*a* extends in the circumferential direction within the slot S4. Thus, the inter-pole crossover wire 59*a* extends obliquely within the slot S4. The inter-pole crossover wire 59*a* is arranged inside the stator 20. The inter-pole crossover wire 59*a* also functions imperfectly as a part of the single coil 51 in a magnetic pole No. 4.

The U-phase winding 50*u* is continuous from the inter-pole crossover wire 59*a* to a winding start portion 55*b*. The U-phase winding 50*u* repeats a basic structure cycle: the winding start portion 55; the single coil 51; the winding finish portion 56; the inter-pole crossover wire 58; the end crossover wire 57; and the inter-pole crossover wire 59, and finally reaches the last single coil. In the last single coil, the U-phase winding 50*u* is continuous from an inter-pole crossover wire 59*e* to the winding start portion 55*f*. The U-phase winding 50*u* is wound on the magnetic pole No. 16 and terminates at the winding finish portion 56*f*. The winding finish portion 56*f* is connected to the neutral point member 64.

The U-phase winding 50*u* provides the magnetic poles No. 1, 4, 7, 10, 13 and 16. The V-phase winding 50*v* and the W-phase winding 50*w* have the same shape as the U-phase winding 50*u*. Thus, the V-phase winding 50*v* provides the magnetic poles No. 2, 5, 8, 11, 14 and 17. The W-phase winding 50*w* provides the magnetic poles No. 3, 6, 9, 12, 15 and 18.

The multiple phase windings 50*u*, 50*v*, 50*w* provide two types of multiple inter-pole crossover wires 58, 59. These inter-pole crossover wires 58, 59 are arranged such that (1) only one of them passes obliquely in the slot, (2) both of them cross each other in the slot, or (3) both of them are out of the slot.

(1) In the slot S2, only the inter-pole crossover wire 58 of the U-phase winding 50*u* is arranged. In the slot S3, only the inter-pole crossover wire 58 of the V-phase winding 50*v* is arranged. In the slot S17, only the inter-pole crossover wire 59 of the V-phase winding 50*v* is arranged. In the slot S18, only the inter-pole crossover wire 59 of the W-phase winding 50*w* is arranged. In these four slots at the start and end of winding, only one inter-pole crossover wire 58 or only one inter-pole crossover wire 59 is obliquely arranged. These slots S2, S3, S17, S18 are also called both-end slots, in each of which one wire, i.e., the inter-pole crossover wire 58 or the inter-pole crossover wire 59 is arranged.

(2) In the slot S4, the inter-pole crossover wire 58 of the W-phase winding 50*w* and the inter-pole crossover wire 59 of the U-phase winding 50*u* are arranged. The two inter-pole crossover wires 58, 59 cross each other in the slot S4, that is, in the inter-pole gap PG. In the slot S5, the inter-pole crossover wire 58 of the U-phase winding 50*u* and the inter-pole crossover wire 59 of the V-phase winding 50*v* are arranged. The two inter-pole crossover wires 58, 59 cross each other in the slot S5, that is, in the inter-pole gap PG. In the slot S6, the inter-pole crossover wire 58 of the V-phase winding 50*v* and the inter-pole crossover wire 59 of the W-phase winding 50*w* are arranged. The two inter-pole crossover wires 58, 59 cross each other in the slot S6, that is, in the inter-pole gap PG. The crossing arrangements seen in the slots S4, S5, S6 are also seen in the slots S7, S8, S9, S10, S11, S12, S13, S14, S15, S16 in which two inter-pole crossover wires 58 and 59 of different phase windings are arranged by repeating of the winding process. The two inter-pole crossover wires 58 and 59 cross each other at the center of the inter-pole gap PG in the axial direction. The two inter-pole crossover wires 58 and 59 cross each other at the center of the inter-pole gap PG in the circumferential direction. These slots S4 to S16 are also called intermediate slots, in each of which two wires, i.e., the inter-pole crossover wire 58 and the inter-pole crossover wire 59 are arranged to cross each other.

(3) In slot S1, neither the inter-pole crossover wire 58 nor the inter-pole crossover wire 59 is disposed in the slot S1. The slot S1 is also referred to as a boundary slot, in which the inter-pole crossover wire is not arranged.

The end crossover wire 57 is arranged on the other end 20*b*. The end crossover wire 57 is arranged along the base end flange 43. The end crossover wire 57 is located radially outward of the base end flange 43. The end crossover wires 57 are arranged so as to overlap each other in the radial direction and the axial direction. In this embodiment, the end crossover wires 57 of different phases are stacked in the axial direction on the other end 20*b*. The number of the end crossover wires 57 arranged on the other end 20*b* is two or less at every positions in the circumferential direction. In the drawings, the symbols *1 and *2 indicate the number of the end crossover wires 57 at the positions. On the axial end portion (the other end 20*b*) of the stator 20, the multiple end crossover wires 57 are arranged so that (1) only one of them extends, (2) two of them extend to overlap each other, or (3) none of them extends.

(1) The number of the end crossover wires 57 located along the base end flange 43 of the magnetic pole No. 2 is one. The number of the end crossover wires 57 located along the base end flange 43 of the magnetic pole No. 17 is one. The number of the end crossover wires 57 overlapping the slot S3 in the axial direction is one. This is because the inter-pole crossover wire 58 of the V-phase winding 50*v* is arranged in the slot S3. The number of the end crossover wires 57 overlapping the slot S4 in the axial direction is one. This is because two of the inter-pole crossover wires 58, 59 are arranged in the slot S4. The number of the end crossover wires 57 overlapping the slot S5 in the axial direction is one. This is because two of the inter-pole crossover wires 58, 59 are arranged in the slot S5. The presence of the one end crossover wire 57 at the ends of the slots S3, S4, S5 is repeatedly provided also to the slots S6, S7, S8, S9, S10, S11, S12, S13, S14, S15, S16, S17.

(2) The number of the end crossover wires 57 located along the base end flange 43 of the magnetic pole No. 3 is two. The number of the end crossover wires 57 located along the base end flange 43 of the magnetic pole No. 4 is two. The number of the end crossover wires 57 located along the base end flange 43 of the magnetic pole No. 5 is two. The presence of the multiple end crossover wires 57 on the base end flanges 43 of the magnetic poles No. 3, 4, 5 is repeatedly provided also to the base end flanges 43 of the magnetic poles No. 6, 7, 8, 9, 10, 11, 12, 13, 14, 15, 16.

(3) There is no end crossover wire 57 overlapping the slot S1 in the axial direction (zero). There is no end crossover wire 57 located along the base end flange 43 of the magnetic pole No. 1. There is no end crossover wire 57 located along the base end flange 43 of the magnetic pole No. 18. This is because the boundary slot S1 and the other ends 20b of the both end magnetic poles do not require a crossover wire. There is no end crossover wire 57 overlapping the slot S2 in the axial direction. This is because the inter-pole crossover wire 58 functioning as a crossover wire is arranged in the slot S2. There is no end crossover wire 57 overlapping the slot S18 in the axial direction. This is because the inter-pole crossover wire 59 functioning as a crossover wire is arranged in the slot S18.

In this embodiment, the crossover wire 54 includes one inter-pole crossover wire 58, one inter-pole crossover wire 59, and one end crossover wire 57. One inter-pole crossover wire 58 extends from the winding finish portion 56 of one of the two same-phase single coils 51. One inter-pole crossover wire 59 extends from the winding start portion 55 of another of the two same-phase single coils 51. The crossover wire 54 includes one inter-pole crossover wire 58, the end crossover wire 57, and one inter-pole crossover wire 59, in this order. Each of the multiple phase windings 50u, 50v, 50w forming the multi-phase winding has inter-pole crossover wires 58, 59. As a result, in some of the inter-pole gaps PG, the inter-pole crossover wires 58, 59 of different phases cross each other. The multiple slots S1 to S18 formed between the multiple magnetic poles include one slot S1 in which there is no inter-pole crossover wire 58, 59. The multiple slots S1 to S18 include multiple slots S2, S3, S17, S18 in which one inter-pole crossover wire 58 or one inter-pole crossover wire 59 is arranged. The multiple slots S1 to S18 include multiple slots S4, S5, S6, S7, S8, S9, S10, S11, S12, S13, S14, S15, S16 in which two inter-pole crossover wires 58, 59 are arranged so as to cross each other. The end crossover wire 57 is arranged on one of inner and outer surfaces of the stator 20 in the radial direction, which is opposite from the surface on which the single coil 51 is arranged. In other words, the magnetic pole includes the base end flange 43, and the end crossover wire 57 and the inter-pole crossover wires 58, 59 are arranged on different sides of the base end flange 43 in the radial direction of the rotary electric machine 1.

A method for manufacturing the rotary electric machine includes a step of assembling the rotor 10 and a step of assembling the stator 20. The step of assembling the stator 20 includes a step of assembling the stator core 30, a step of mounting the insulator 40 on the stator core 30, a step of winding the coil 50, and a step of forming the multiple connection portions 65, 66, 67, 68, 69. In the step of winding the coil 50, a winding machine is used to wind a wire around the stator core 30 with the insulator 40 so as to form the coil 50. This step can be carried out by one winding nozzle in sequence or by multiple winding nozzles in parallel.

In the step of winding the coil 50, the winding starts from the one end 20a and the first single coil 51 is wound. This step proceeds while the end crossover wire 57 is arranged on the other end 20b. In a repeating step, the single coil 51 is started to be wound from the other end 20b, and the single coils 51 are successively wound. Moreover, at this step, the single coils 51 are wound one after another while both the inter-pole crossover wire 58 and the inter-pole crossover wire 59 are arranged in the slots. In this step, winding of the last single coil 51 is completed on the one end 20a.

In the step of forming the multiple connection portions 65, 66, 67, 68, 69, the multiple coil ends 52 are connected to the multiple conductive members 60. In this step, the conductive member 60 and the coil end 52 are electrically connected. This step can be performed in a manner: the conductive member 60 is arranged in the inter-pole gap PG; the coil end 52 is arranged so as to be in contact with the conductive member 60; the joint portion 60d is bent so as to wrap around the coil end 52; and fusing is performed. Alternatively, this step may be performed in a manner: the coil end 52 is arranged so as to be in contact with the conductive member 60 outside the inter-pole gap PG; the joint portion 60d is bent so as to wrap around the coil end 52; fusing is performed; and the conductive member 60 is arranged in the inter-pole gap PG.

Further, the method for manufacturing the rotary electric machine includes a step of fixing the multiple conductive members 60. This step can be performed before or after the step of forming the multiple connection portions. In this embodiment, the terminal block 80 positions and fixes the multiple power end members 61, 62, 63 at predetermined positions on the stator 20.

According to the embodiment described above, at least one inter-pole crossover wire 58 or inter-pole crossover wire 59 is provided. Thus, the number of the end crossover wires 57 on the axial end portion of the slot (inter-pole gap PG) in which the inter-pole crossover wire 58 or the inter-pole crossover wire 59 is arranged can be reduced. This is because the inter-pole crossover wires 58, 59 provides the function of the end crossover wire 57 arranged on the axial end portion of the slot (inter-pole gap PG). In particular, the inter-pole crossover wire 58 and the inter-pole crossover wire 59 of different phase windings cross each other in the slot (inter-pole gap PG). Thus, the number of the end crossover wires 57 on the axial end portion of the slot (inter-pole gap PG) in which the inter-pole crossover wire 58 and the inter-pole crossover wire 59 are arranged can be reduced to the number of phases—2. In the case of a three-phase winding, the number of end crossover wires 57 on the axial end portion of the slot (inter-pole gap PG) in which the inter-pole crossover wire 58 and the inter-pole crossover wire 59 are arranged can be reduced to one. As a result, a compact rotary electric machine 1 is provided.

According to the embodiment described above, the connection portions 65, 66, 67, 68, 69 for the multiple coil ends 52 can be arranged in the inter-pole gaps PG. Therefore, miniaturization of the connection portions 65, 66, 67, 68, 69 for the coil ends 52 in the axial direction is achieved. According to this embodiment, the connection portions 65, 66, 67, 68, 69 can be easily manufactured. According to this embodiment, a rotary electric machine having a short length in the axial direction is provided.

Second Embodiment

This embodiment is a modification based on the preceding embodiment. In the above embodiment, the rotary electric machine 1 includes the neutral point member 64 and the arc-shaped terminal block 80. Instead, in this embodiment, a rotary electric machine 1 includes a multi-terminal neutral point member 264 and an annular terminal block 280. In this embodiment, the elements corresponding to those in the above-described embodiment are assigned with the same reference numerals. The descriptions of the above embodiment can be referred to for the descriptions of the elements assigned with the same reference numerals. In this embodiment, the rotary electric machine 1 includes a rotor 10 having 20 poles and a stator 20 having 15 poles.

Figure 9:
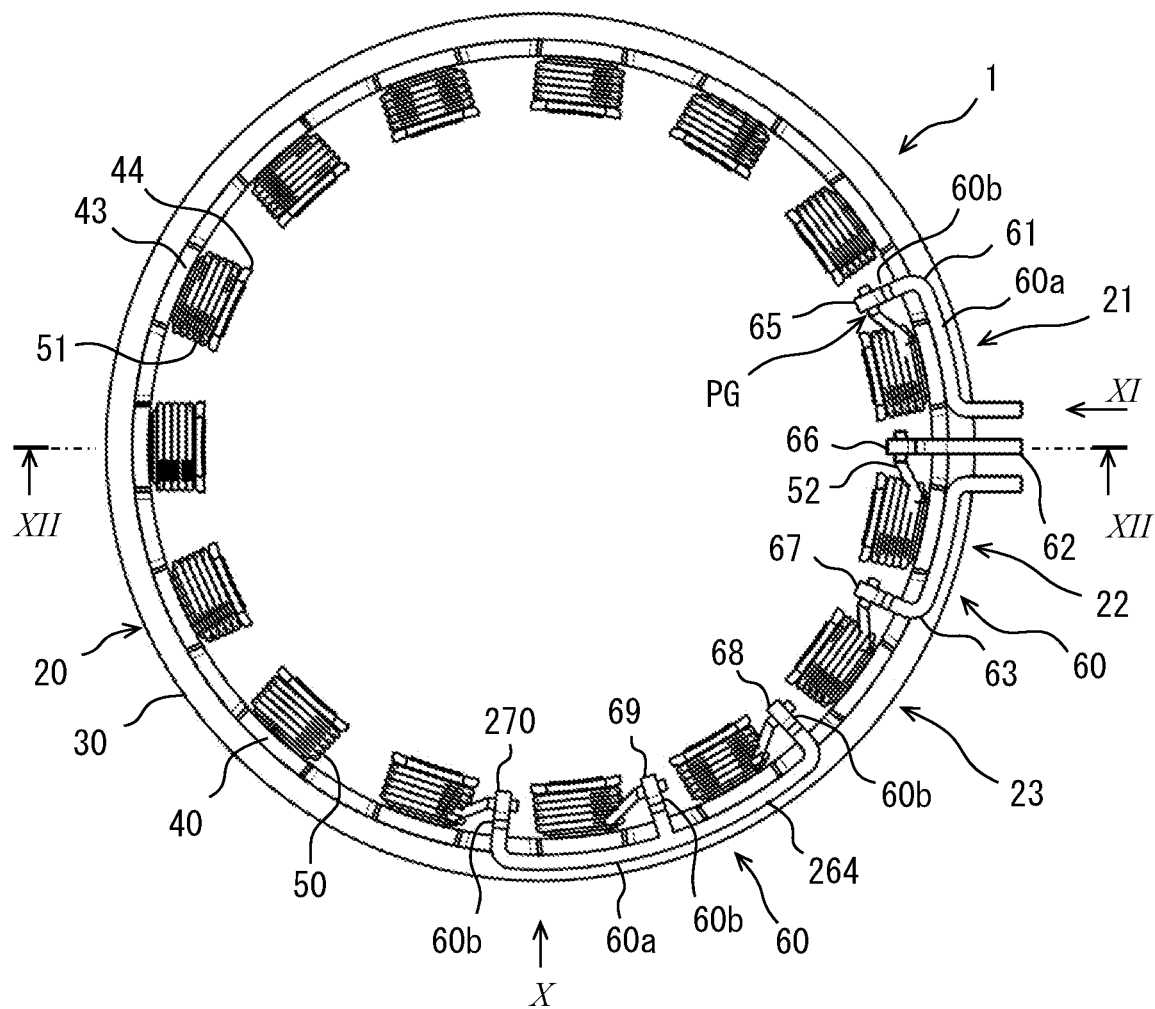
FIG. 9 is a plan view showing a terminal block excluding a stator core.

In FIGS. 5 to 12, particularly in FIG. 9, the neutral point member 264 has three connection portions 68, 69, 270. The neutral point member 264 provides three terminals for a three phase winding. The connection portion 68 provides electrical connection between a coil end of a first phase winding of the three phase winding and the neutral point member 64. The connection portion 69 provides electrical connection between a coil end of a second phase winding of the three phase winding and the neutral point member 264. The connection portion 70 provides electrical connection between a coil end of a third phase winding of the three phase winding and the neutral point member 64.

The multiple connection portions 65, 66, 67, 68, 69, 270 are dispersively arranged in the multiple inter-pole gaps PG next to each other. The multiple connection portions 65, 66, 67, 68, 69, 270 are arranged in the multiple inter-pole gaps PG next to each other, in a one-to-one relationship therebetween. In this embodiment, one connection portion is arranged in one inter-pole gap PG. As a result, the six connection portions 65, 66, 67, 68, 69, 270 are arranged in the six inter-pole gaps PG next to each other. The neutral point member 264 has a shape that can be called a comb teeth type or a pitchfork type. The neutral point member 264 includes an arc portion that extends in the circumferential direction along a yoke 32 of a stator core 30, and radial portions that extends in the radial direction inward from the arc portion as a connection portion. The radial portions are disposed at equal intervals in the circumferential direction.

Also in this embodiment, the multiple conductive members 60 include a circumferential extending portion 60a and a radial extending portion 60b. For example, the power end members 61, 63 have the circumferential extending portion 60a and the radial extending portion 60b. The power end member 62 includes only the radial extending portion 60b. The neutral point member 264 includes a circumferential extending portion 60a and three radial extending portions 60b.

In the above-described embodiment, the terminal block 80 supports only the multiple power end members 61, 62, 63. The terminal block 80 does not support the neutral point member 64. In contrast, the terminal block 280 supports all of the multiple conductive members 60. The terminal block 280 supports both the multiple power end members 61, 62, 63 and the neutral point member 264. The multiple conductive members 60 are insert-molded on the terminal block 280.

In FIGS. 5 to 12, in particular FIGS. 5, 6, 7 and 8, the terminal block 280 has an annular shape. The terminal block 280 extends in the circumferential direction along the yoke 32. The terminal block 280 is located outward of the base end flange 43 in the radial direction. Also in this embodiment, the terminal block 280 provides a body portion 281 and a connector portion 82. The body portion 281 has an annular shape. The connector portion 82 is positioned at a part of the annular body portion 281.

Figure 10:
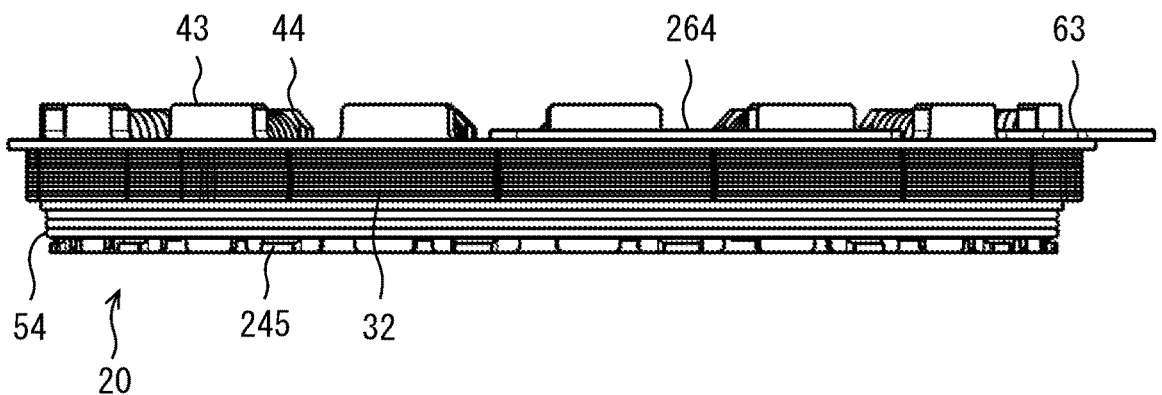
FIG. 10 is a side view in an arrow X in FIG. 9.
Figure 11:
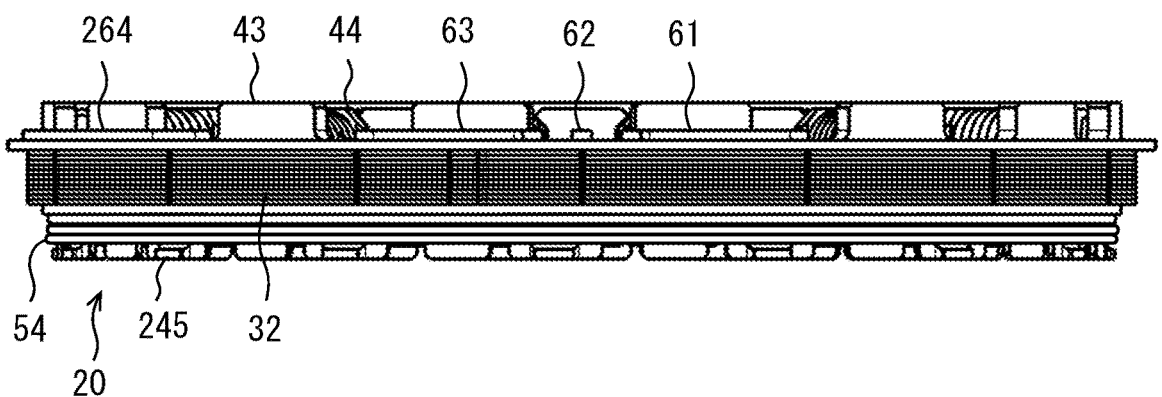
FIG. 11 is a side view in an arrow XI in FIG. 9.
Figure 12:
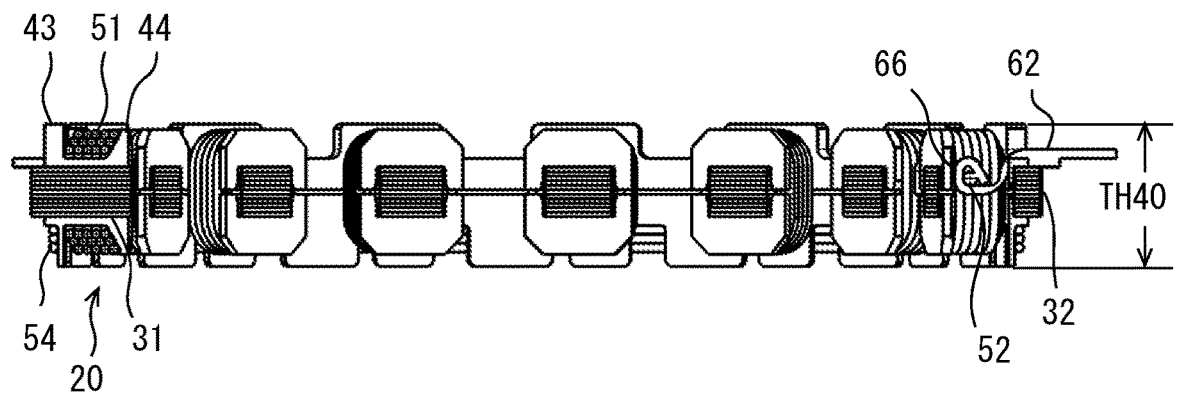
FIG. 12 is a cross-sectional view taken along a line XII-XII of FIG. 9.

As shown in FIGS. 10 and 11, an insulator 40 has a protrusion 245. The insulator 40 has multiple protrusions 245. The protrusion 245 further projects outward in the radial direction from a radially outer surface of an end portion of the base end flange 43 in the axial direction. The protrusion 245 functions as a stopper for positioning and holding multiple crossover wires 54 along the base end flange 43. Arrangement and the number of the multiple crossover wires 54 are shown in winding diagrams described later.

Figure 13:
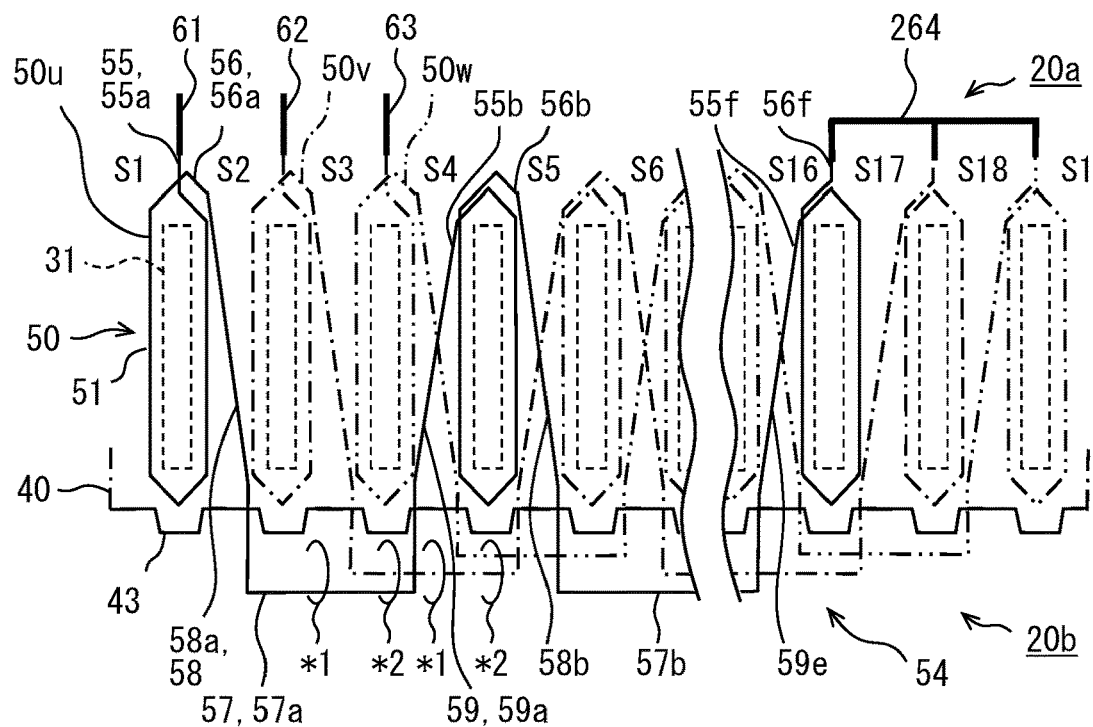
FIG. 13 is a winding diagram of a stator.

In FIG. 13, the neutral point member 264 connects the multiple phase windings 50u, 50v, 50w. The coil 50 is the same as in the above embodiment.

Also in this embodiment, the number of end crossover wires 57 on the axial end portion of the slot (inter-pole gap PG) in which the inter-pole crossover wire 58 and the inter-pole crossover wire 59 are arranged can be reduced. As a result, a compact rotary electric machine 1 is provided. Also in this embodiment, the connection portions 65, 66, 67, 68, 69, 270 for the multiple coil ends 52 can be arranged in the inter-pole gaps PG. Therefore, miniaturization of the connection portions 65, 66, 67, 68, 69, 270 for the multiple coil ends 52 in the axial direction is achieved. According to this embodiment, the connection portions 65, 66, 67, 68, 69, 270 can be easily manufactured. According to this embodiment, a rotary electric machine having a short length in the axial direction is provided.

Third Embodiment

This embodiment is a modification based on the preceding embodiment. In the above-described embodiments, the rotary electric machine 1 includes both the inter-pole crossover wires 58 and the inter-pole crossover wires 59. Alternatively, in this embodiment, a rotary electric machine 1 includes only inter-pole crossover wires 58.

Figure 14:
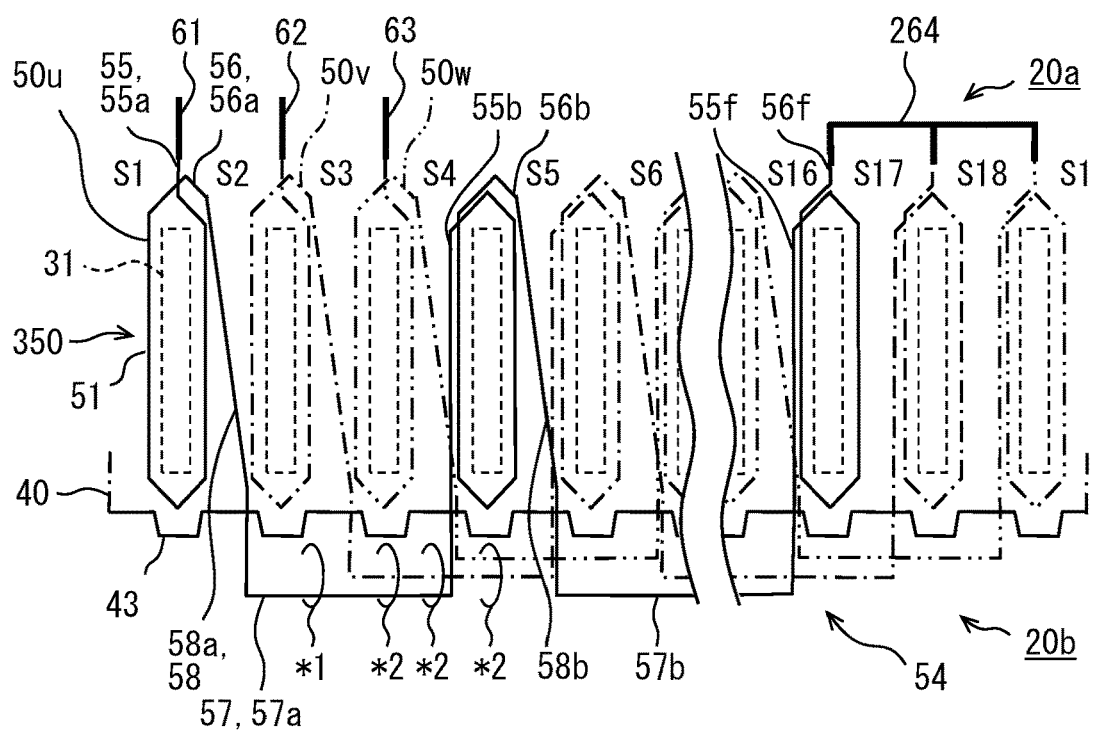
FIG. 14 is a winding diagram of a stator according to a third embodiment.

In FIG. 14, the rotary electric machine 1 includes a coil 350. The coil 350 has only the inter-pole crossover wires 58 in multiple slots. As a result, the number of end crossover wires 57 is reduced on the end portion of a slot in the axial direction in which the inter-pole crossover wire 58 is arranged. The number of end crossover wires 57 is reduced to two or less.

In this embodiment, a crossover wire 54 includes one inter-pole crossover wire 58 extending from the winding finish portion 56 of one of the two same-phase single coils 51, and the end crossover wire 57 only. Also in this embodiment, a compact rotary electric machine 1 is provided.

Fourth Embodiment

This embodiment is a modification based on the preceding embodiment. In the above-described embodiments, the rotary electric machine 1 includes the inter-pole crossover wires 58 at least. Alternatively, in this embodiment, a rotary electric machine 1 includes only inter-pole crossover wires 59.

Figure 15:
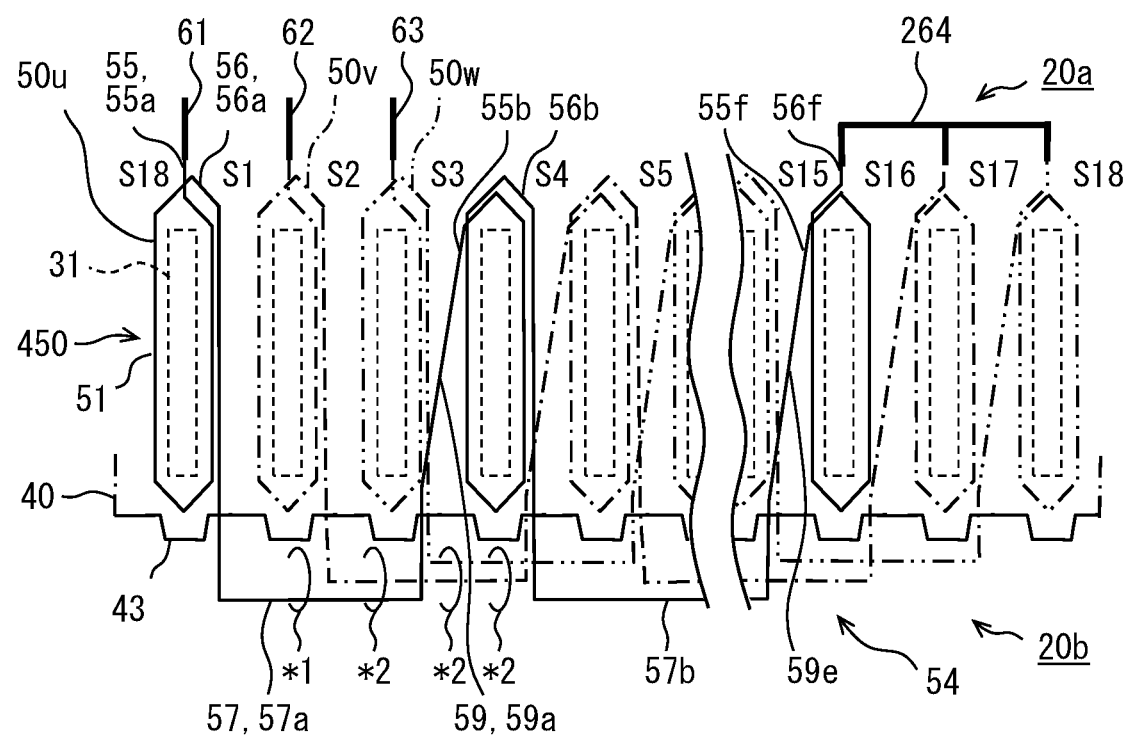
FIG. 15 is a winding diagram of a stator according to a fourth embodiment.

In FIG. 15, the rotary electric machine 1 includes a coil 450. The coil 450 has only the inter-pole crossover wires 59 in multiple slots. As a result, the number of end crossover wires 57 is reduced on the end portion of a slot in the axial direction in which the inter-pole crossover wire 59 is arranged. The number of end crossover wires 57 is reduced to two or less.

In this embodiment, a crossover wire 54 includes one inter-pole crossover wire 59 extending from the winding start portion 55 of another of the two same-phase single coils 51, and the end crossover wire 57 only. Also in this embodiment, a compact rotary electric machine 1 is provided.

Fifth Embodiment

This embodiment is a modification based on the preceding embodiment. In the above-described embodiments, the rotary electric machine 1 has the end crossover wires 57 arranged outward of the base end flange 43 in the radial direction. Additionally, in this embodiment, a base end flange 43 provides multiple communication portions 548, 549 for end crossover wires 57. In this embodiment, a stator 20 provides fifteen magnetic poles.

Figure 16:
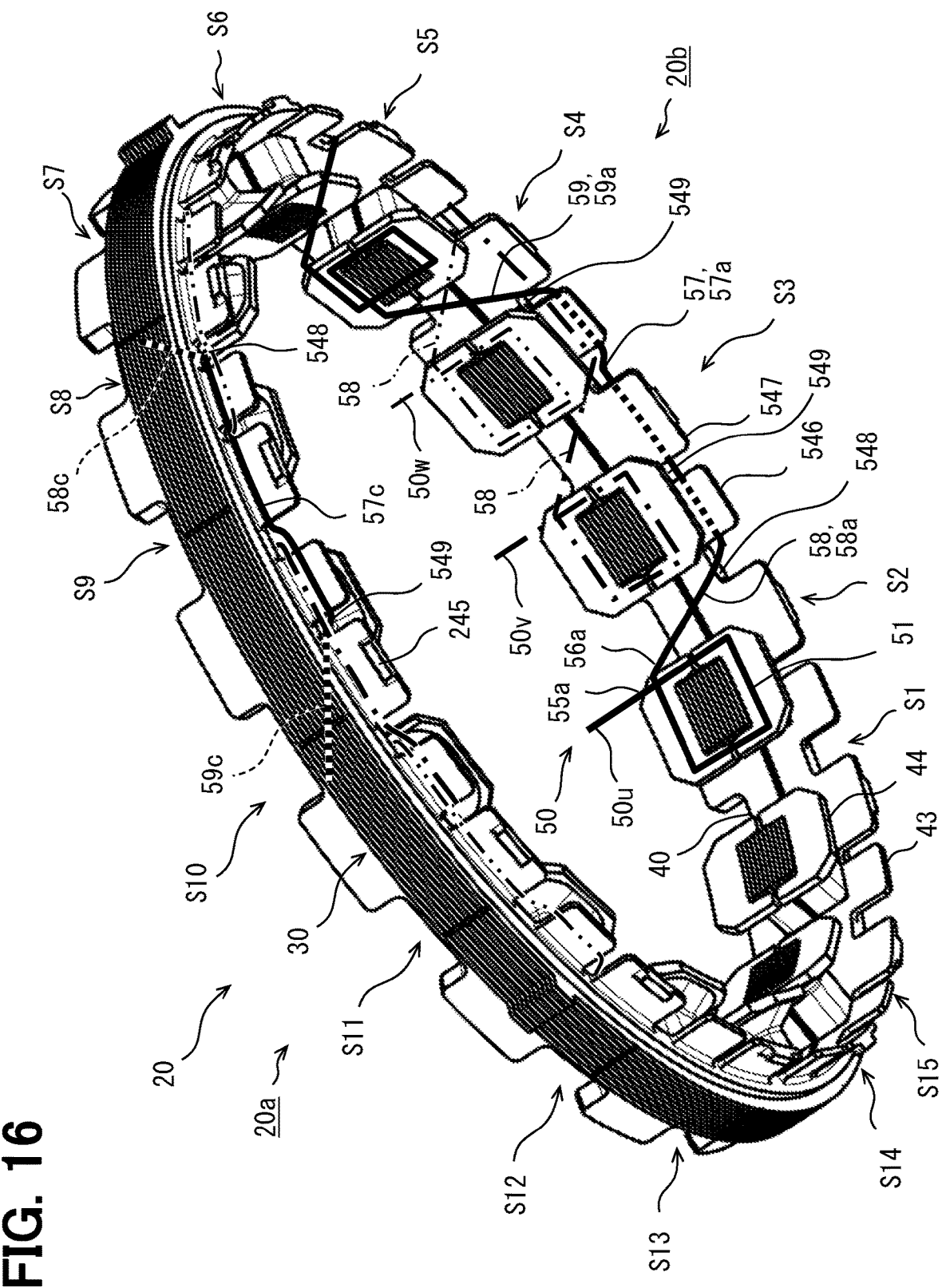
FIG. 16 is a perspective view of a stator according to a fifth embodiment.

In FIG. 16, the stator 20 includes a stator core 30, an insulator 40, and a coil 50. In the figure, the end crossover wires 57, inter-pole crossover wires 58, and inter-pole crossover wires 59 in the stator 20 are illustrated. In order to facilitate understanding and to avoid complicating the drawing, the coil 50 is schematically illustrated and is partially illustrated by a hidden line (dash line). The insulator 40 includes the base end flange 43 and a top end flange 44. The base end flange 43 and the top end flange 44 define a range of the single coil 51. Further, the base end flange 43 includes multiple communication portions for defining positions of wires of the coil 50. The multiple communication portions provide slit openings in the radial direction. The multiple communication portions allow the wires to be arranged. The multiple communication portions are located at both ends of the end crossover wire 57 and define a range of the end crossover wire 57 in the circumferential direction. The coil 50 includes multiple phase windings 50*u*, 50*v*, 50*w*. The coil 50 is wound from the three magnetic poles illustrated in the center of the figure.

The base end flange 43 is provided for each magnetic pole on one end 20*a*. The base end flange 43 includes a first flange piece 546 and a second flange piece 547 on the other end 20*b* for providing the multiple communication portions. The first flange piece 546 is located outward of each magnetic pole in the radial direction and protrudes in the axial direction. The first flange piece 546 is also called a magnetic pole flange. The second flange piece 547 is located outward of each slot S1 to S15 in the radial direction and protrudes in the axial direction. The second flange piece 547 has a protrusion 245. The second flange piece 547 is also called a slot flange. The first flange pieces 546 and the second flange pieces 547 are alternately provided along the circumferential direction. The first flange pieces 546 and the second flange pieces 547 define therebetween first communication portions 548 and second communication portions 549 alternately. With respect to the processing direction of the winding process, the first communication portion 548 is located frontward of the first flange piece 546, and the second communication portion 549 is located rearward of the first flange piece 546. In other words, the second communication portion 549 is located frontward of the second flange piece 547, and the first communication portion 548 is located rearward of the second flange piece 547.

The first communication portion 548 and the second communication portion 549 are located at different ends of the end crossover wire 57, respectively. The first communication portion 548 is located between the inter-pole crossover wire 58 and the end crossover wire 57 and defines the boundary between them. The first communication portion 548 is located at the finish end of the inter-pole crossover wire 58. The first communication portion 548 is located at the start end of the end crossover wire 57. The first communication portion 548 is also an outlet communication portion that draws the wire from inside to outside the stator 20. The second communication portion 549 is located between the end crossover wire 57 and the inter-pole crossover wire 59 and defines the boundary between them. The second communication portion 549 is located at the start end of the inter-pole crossover wire 59. The second communication portion 549 is located at the finish end of the end crossover wire 57. The second communication portion 549 is also an inlet communication portion that draws the wire from outside to inside the stator 20. In this embodiment, two inter-pole crossover wires 58, 59 are arranged in the slot. The second communication portion 549 located frontward of the second flange piece 547 that is the slot flange provides an inlet for drawing the wire from outside to inside of the stator 20. The first communication portion 548 located rearward of the second flange piece 547 that is the slot flange provides an outlet for drawing the wire from inside to outside of the stator 20. When the rotary electric machine 1 includes both the inter-pole crossover wire 58 and the inter-pole crossover wire 59, both the first communication portion 548 and the second communication portion 549 are used. When the rotary electric machine 1 includes the inter-pole crossover wire 58 or the inter-pole crossover wire 59, only the first communication portion 548 or only the second communication portion 549 are used. For example, when the rotary electric machine 1 includes only the inter-pole crossover wire 58, only the first communication portion 548 is used as the inlet and the outlet. For example, when the rotary electric machine 1 includes only the inter-pole crossover wire 59, only the second communication portion 549 is used as the inlet and the outlet.

The U-phase winding 50*u* will be described as a representative example. The U-phase winding 50*u* starts to be wound from the winding start portion 55*a* on the first magnetic pole and is continuous from the winding finish portion 56*a* to the inter-pole crossover wire 58*a*. The inter-pole crossover wire 58*a* is drawn outward of the base end flange 43 in the radial direction through the first communication portion 548, and is continuous to the end crossover wire 57*a*. The end crossover wire 57*a* is drawn inward of the base end flange 43 in the radial direction through the second communication portion 549, and is continuous to the inter-pole crossover wire 59*a*. The multiple phase windings 50*u*, 50*v*, 50*w* have similar shapes. Therefore, in some slots, the inter-pole crossover wire 58 of one phase winding intersects with the inter-pole crossover wire 59 of another phase winding. For example, in the slot S4, the inter-pole crossover wire 58 of the W-phase winding 50*w* and the inter-pole crossover wire 59 of the U-phase winding 50*u* cross each other. In this embodiment, since fifteen magnetic poles are provided, the coil 50 includes elements identified by the a, b, c, d, e identifiers. For example, between the magnetic pole No. 7 and the magnetic pole No. 10, an inter-pole crossover wire 58*c*, an end crossover wire 57*c*, and an inter-pole crossover wire 59*c* are arranged. The end crossover wire 57*c* extends from the first communication portion 548 as an outlet to the second communication portion 549 as an inlet.

Figure 17:
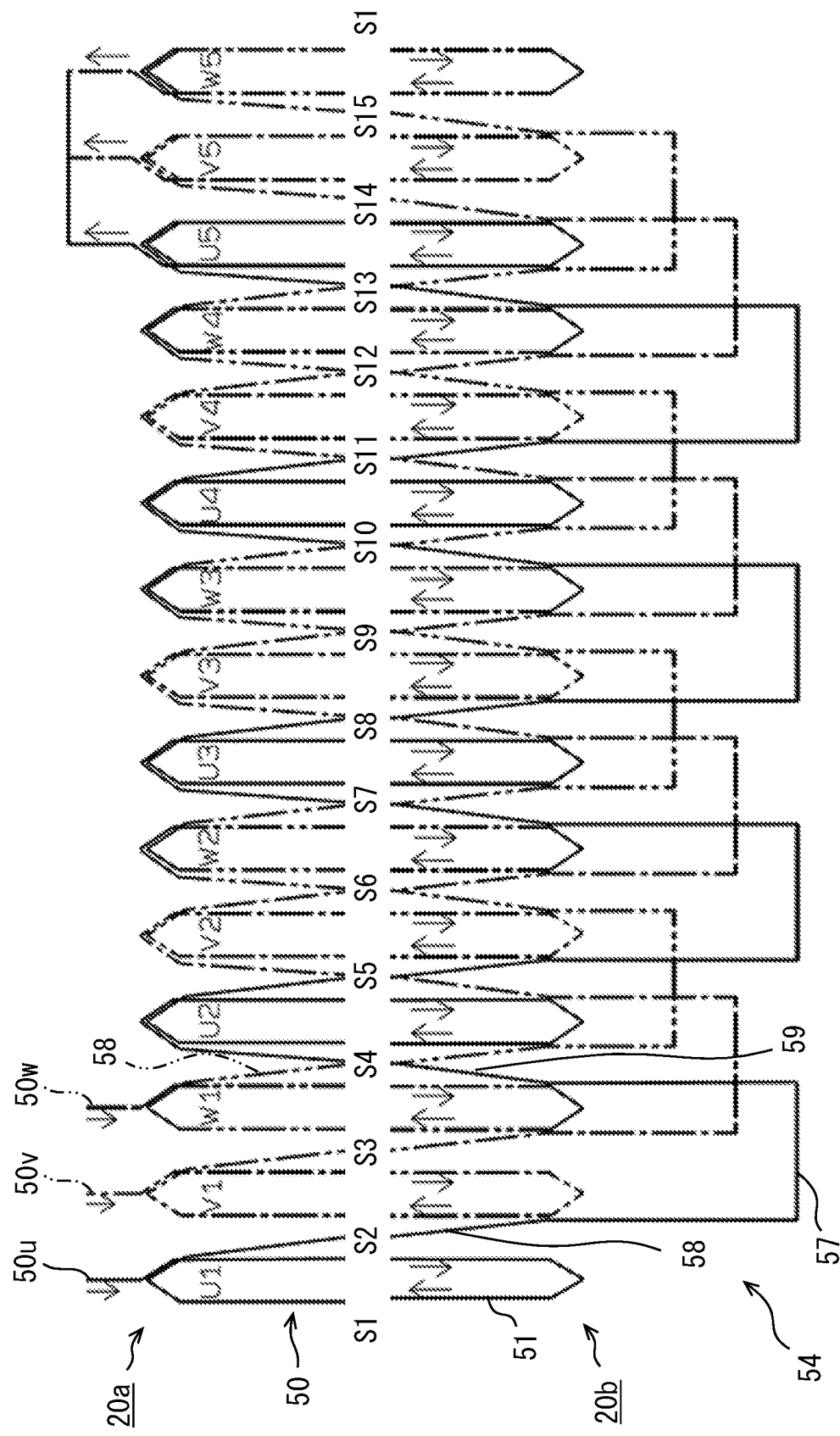
FIG. 17 is a winding diagram of a stator according to a fifth embodiment.

In FIG. 17, one phase winding has the single coils 51 positioned on both sides of the inter-pole crossover wire 58, the end crossover wire 57, and the inter-pole crossover wire 59. The coil 50 is illustrated as viewed from an inside of the stator 20. Therefore, in one slot, two wires of different phase windings, i.e., the inter-pole crossover wire 58 and the inter-pole crossover wire 59 cross each other. As a result, the number of the end crossover wires 57 outside the base end flange 43 is reduced, and the compact rotary electric machine 1 is provided.

Sixth Embodiment

This embodiment is a modification based on the preceding embodiment. In the above-described embodiments, the rotary electric machine 1 includes both the inter-pole crossover wires 58 and the inter-pole crossover wires 59. Additionally, in this embodiment, a rotary electric machine 1 includes only inter-pole crossover wires 58.

Figure 18:
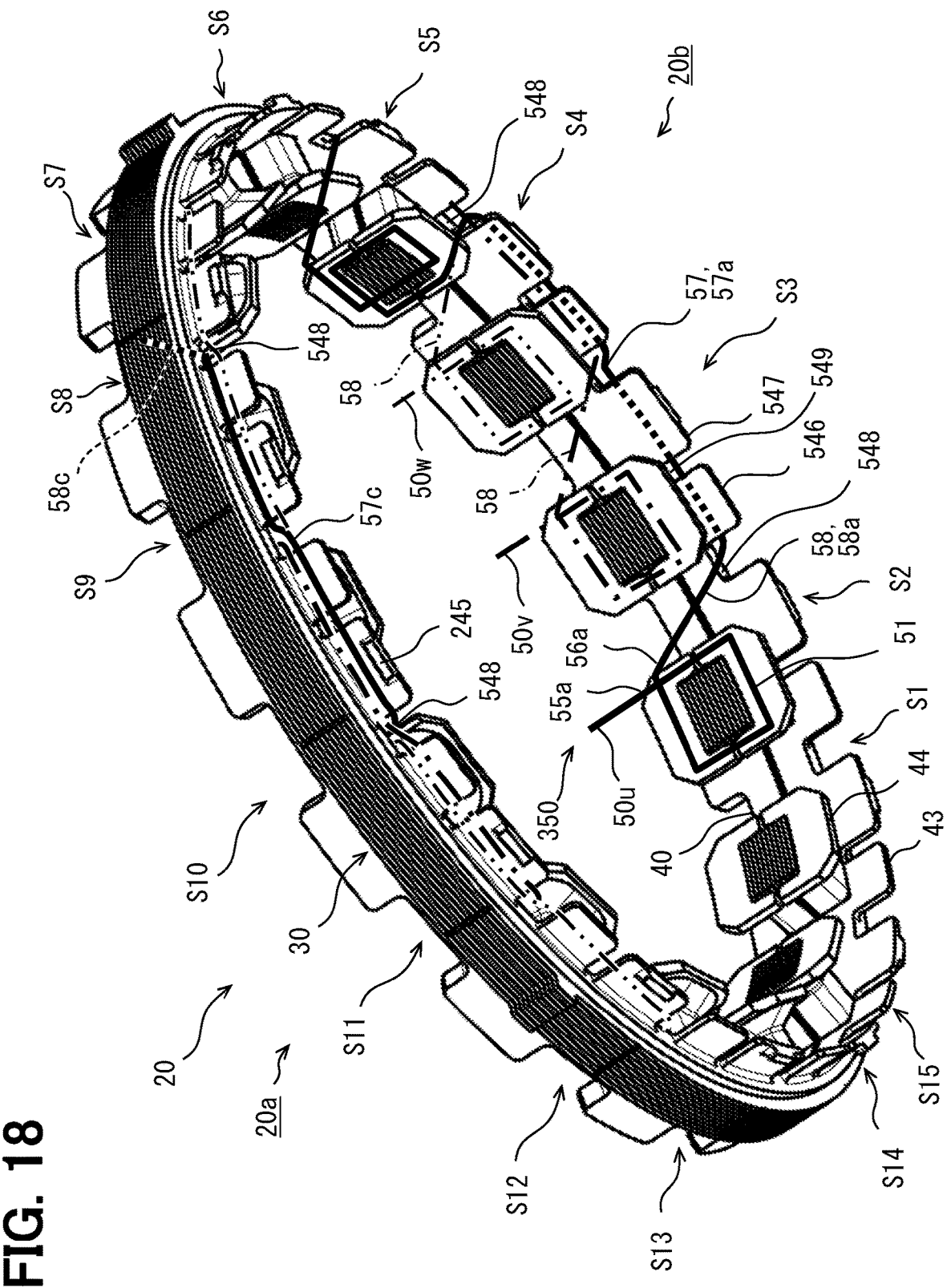
FIG. 18 is a perspective view of a stator according to a sixth embodiment.

In FIG. 18, a stator 20 includes an insulator 40 and a coil 350 described in the fifth embodiment. The coil 350 includes only inter-pole crossover wires 58. In this embodiment, only first communication portions 548 are used as inlets and outlets. For example, the U-phase winding 50u is drawn outward from one first communication portion 548 and is drawn inward from another first communication portion 548. In this configuration, since the coil 350 is formed only by the inter-pole crossover wires 58, the end crossover wires 57 become slightly long. For example, an end crossover wire 57c extends to a first communication portion 548 immediately before the magnetic pole No. 10.

Figure 19:
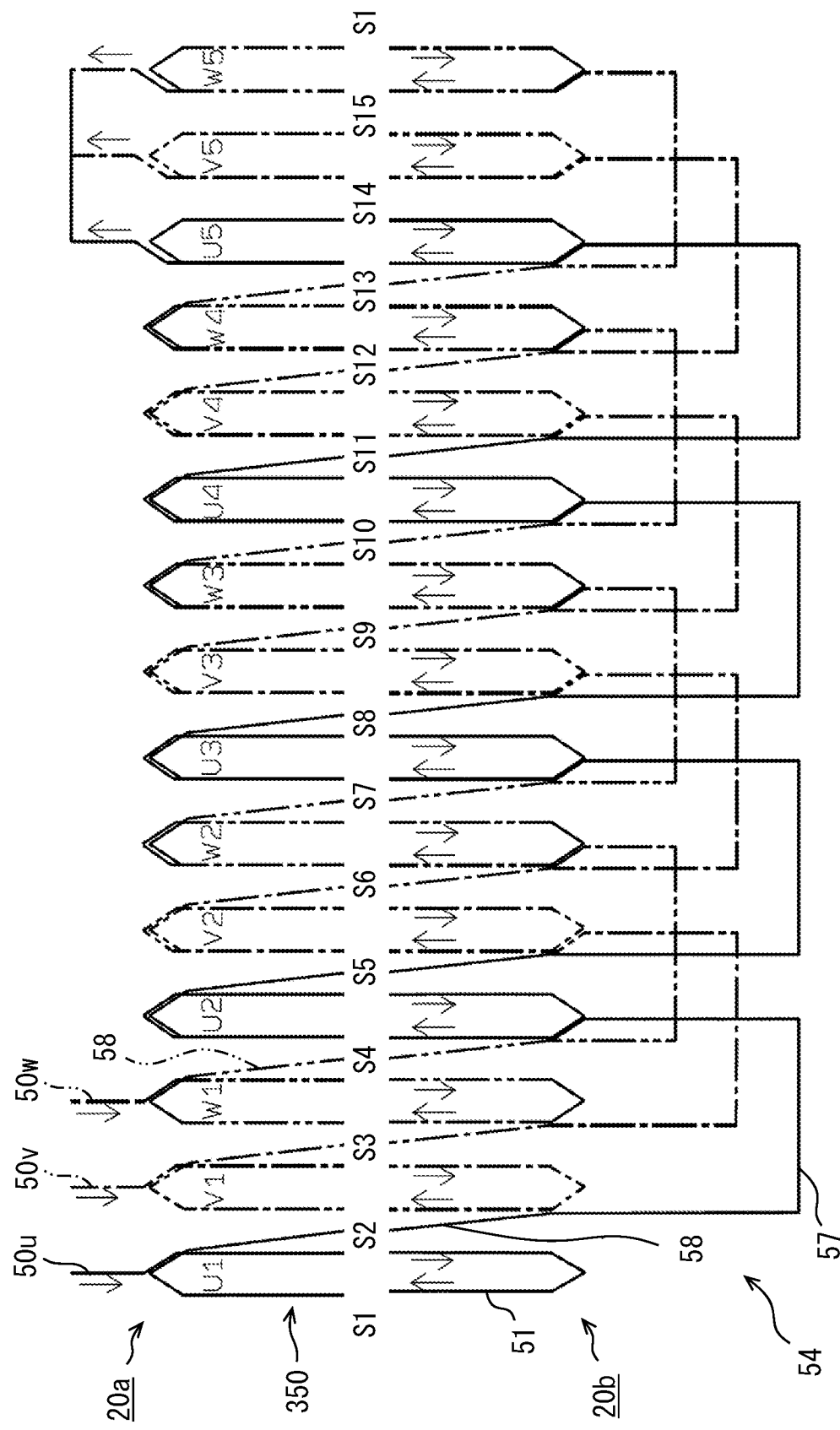
FIG. 19 is a winding diagram of a stator according to a sixth embodiment.

In FIG. 19, the coil 350 includes only inter-pole crossover wires 58. Instead of the coil 350, a coil 450 including only the inter-pole crossover wires 59 may be provided. Also in this embodiment, a compact rotary electric machine 1 is provided.

The disclosure in this specification, the drawings, and the like is not limited to the illustrated embodiments. The disclosure encompasses the illustrated embodiments and variations thereof by those skilled in the art. For example, the present disclosure is not limited to the combinations of components and/or elements shown in the embodiments. The present disclosure may be implemented in various combinations. The present disclosure may have additional portions which may be added to the embodiments. The present disclosure encompasses omission of the components and/or elements of the embodiments. The present disclosure encompasses the replacement or combination of components and/or elements between one embodiment and another. The disclosed technical scope is not limited to the description of the embodiment.

In the above embodiments, the rotary electric machine 1 is an inner rotor type. Alternatively, the rotary electric machine 1 may be an outer rotor type. In the above embodiments, the rotary electric machine 1 provides an electric motor. Alternatively, the rotary electric machine 1 may provide a generator or a generator motor. Further, the rotary electric machine 1 can be used for various purposes such as a servo motor and a step motor.

In the above embodiments, the stator core 30 is provided by a steel plate in which the multiple teeth 31 and the yoke 32 are continuous. Alternatively, the stator core 30 may be provided by a so-called multi-split core. In this case, the stator core 30 is provided by a connected body of multiple partial cores. For example, one partial core is provided by a continuous body of one partial-annular partial yoke and one tooth.

In the above embodiments, the multiple conductive members 60 are insert-molded on the terminal blocks 80, 280. Alternatively, the multiple conductive members 60 may be press-fitted and fixed to the terminal blocks 80, 280. Further, the multiple conductive members 60 may be supported by or fixed to the insulator 40 without the terminal blocks 80, 280. For example, the multiple conductive members 60 may be directly fixed to the insulator 40 by snap fitting. Also in this configuration, since the connection portions 65, 66, 67, 68, 69, 270 are arranged in the inter-pole gaps PG, the physical size of the coil end 52 of the rotary electric machine 1 can be reduced. In the above embodiments, the connector portion 82 has an opening facing outward in the radial direction in the outside of the housing 3. Alternatively, the connector portion 82 may have an opening facing in the axial direction outside the housing 3. In this case, the connector portion 82 forms an electrical connection by receiving a connector of the external circuit moved along either of the axial directions.

In the above embodiments, the coil 50 is provided by star connection. Alternatively, the coil 50 may be provided by delta connection. In this case, the connection portion between one conductive member 60 and at least two coil ends 52 is arranged in the inter-pole gap PG. Further, in the above embodiments, one phase winding is provided by one wire. Alternatively, one phase winding may be provided by multiple wires as a parallel circuit. In this case, one single coil 51 is provided by the parallel circuit of the multiple wires. For example, when one single coil 51 is provided by two wires, a connection portion between the conductive member 60 that provides one power terminal and two coil ends 52, in the star connection, is arranged in the inter-pole gap PG. For example, when one single coil 51 is provided by two wires, a connection portion between the conductive member 60 that provides one power terminal and four coil ends 52, in the delta connection, is arranged in the inter-pole gap PG.

In the above embodiments, the conductive member 60 is a bus bar. Alternatively, the conductive member 60 may be an electrode for a terminal, a lead wire, or a conductor foil on a substrate. Also in these cases, since the connection portion is arranged in the inter-pole gap PG, miniaturization can be achieved. In the above embodiments, the coil 50 is made of copper or a copper alloy. Alternatively, the coil 50 may be made of aluminum or aluminum alloy. In the above embodiments, the connection between the conductive member and the coil end 52 is provided by fusing. Alternatively, the connection between the conductive member and the coil end 52 may be provided by heat staking, welding, soldering, for example.

In the above embodiments, the conductive member 60 has the connector terminal extending in the radial direction as the power end. Alternatively, the conductive member 60 may extend along the axial direction. Also in this cases, since the connection portion is arranged in the inter-pole gap PG, miniaturization in the axial direction can be achieved. In the above embodiments, the multiple power end members 61, 62, 63 provide connector terminals. Alternatively, the power end members 61, 62, 63 may provide press-fit terminals, solder terminals, for example.

In the above embodiments, the inter-pole gap PG is a cavity. Alternatively, the inter-pole gap PG may be filled with a resin member after disposing the conductive member 60. Further, the conductive member 60 arranged in the inter-pole gap PG may be coated with a thin resin material. In any configuration, the connection portion which is a part of the conductive member 60 is disposed in the inter-pole gap PG. Thus, the miniaturized rotary electric machine 1 is provided.

In the above embodiments, the multiple coil ends at winding start are used the power ends, and the multiple coil ends at winding end are used as the neutral points. Alternatively, the multiple coil ends at winding end may be used the power ends, and the multiple coil ends at winding start may be used as the neutral points. Further, the coil end may be the power end or the neutral point without using the conductive member 60. For example, the multiple coil ends at the start or end of winding may be drawn out long as power ends. For example, the multiple coil ends at the start or end of winding may be directly joined as neutral points.

While the present disclosure has been described with reference to various exemplary embodiments thereof, it is to be understood that the disclosure is not limited to the disclosed embodiments and constructions. To the contrary, the disclosure is intended to cover various modifications and equivalent arrangements. In addition, while the various elements of the disclosure are shown in various combinations and configurations, which are exemplary, other various combinations and configurations, including more, less or only a single element, are also within the spirit of the disclosure.

What is claimed is:

1. A rotary electric machine comprising
a multi-phase winding including a plurality of magnetic poles circumferentially arranged in a circumferential direction, wherein:
a plurality of slots are formed between the plurality of magnetic poles;
the multi-phase winding includes crossover wires, each crossover wire connecting two same-phase single coils that provide magnetic poles of the plurality of magnetic poles that are in the same phase;
each crossover wire includes:
an inter-pole crossover wire extending between one end and another end of the multi-phase winding in an axial direction of the multi-phase winding, the inter-pole crossover wire extending through one of the plurality of slots that is between two adjacent poles of the plurality of magnetic poles; and
an end crossover wire extending in the circumferential direction on the other end of the multi-phase winding; and
the plurality of slots include:
a slot in which none of the inter-pole crossover wires is arranged;
a slot in which one of the inter-pole crossover wires is arranged; and
a slot in which two of the inter-pole crossover wires are arranged to cross each other.

2. The rotary electric machine according to claim 1, comprising
a rotor and a stator, wherein
the plurality of magnetic poles are magnetic poles of the stator.

3. The rotary electric machine according to claim 2, wherein
the rotor is arranged radially outward of a rotary body, and the stator is arranged further radially outward of the rotor.

4. The rotary electric machine according to claim 1, wherein
the inter-pole crossover wire of each crossover wire includes:
one inter-pole crossover wire that extends from a winding finish portion of one of the two same-phase single coils; and
one inter-pole crossover wire that extends from a winding start portion of another of the two same-phase single coils.

5. The rotary electric machine according to claim 4, wherein
each of a plurality of phase windings forming the multi-phase winding includes the inter-pole crossover wires, and
the inter-pole crossover wires of different phase windings cross each other in one of the plurality of slots.

6. The rotary electric machine according to claim 1, wherein:
the plurality of magnetic poles include teeth, bobbins, and single coils;
the bobbins include base end flanges at base ends of the teeth;
the end crossover wire and the inter-pole crossover wire of each crossover wire are arranged on different sides of the base end flanges in a radial direction of the multi-phase winding;
the base end flanges include first flange pieces and second flange pieces on the other end of the multi-phase winding to provide multiple communication portions;
the first flange pieces are located outward of the plurality of magnetic poles in the radial direction;
the second flange pieces are located outward of the plurality of slots in the radial direction, the plurality of slots being provided between ones of the teeth;
the first flange pieces and the second flange pieces are alternately provided in the circumferential direction;
the first flange pieces and the second flange pieces define alternately therebetween first communication portions and second communication portions of the multiple communication portions; and
the first communication portions and the second communication portions are each located between one of the inter-pole crossover wires and one of the end crossover wires and define a boundary between the corresponding inter-pole and end crossover wires.

7. The rotary electric machine according to claim 6, wherein
the end crossover wires of the crossover wires are arranged outward of the base end flanges in the radial direction and extend along the base end flanges, and
a number of the end crossover wires is less than two on every position in the circumferential direction.

8. The rotary electric machine according to claim 1, wherein
each crossover wire includes only
the inter-pole crossover wire extending from a winding finish portion of one of the two same-phase single coils, and
the end crossover wire.

9. The rotary electric machine according to claim 1, wherein
each crossover wire includes only
the inter-pole crossover wire extending from a winding start portion of one of the two same-phase single coils, and
the end crossover wire.

10. The rotary electric machine according to claim 1, wherein
the end crossover wires of different phases are stacked in the axial direction on the other end of the multi-phase winding.

11. A rotary electric machine comprising
a multi-phase winding including a plurality of magnetic poles circumferentially arranged in a circumferential direction, wherein:
a plurality of slots are formed between the plurality of magnetic poles;
the multi-phase winding includes crossover wires, each crossover wire connecting two same-phase single coils that provide magnetic poles of the plurality of magnetic poles that are in the same phase;

each crossover wire includes:
- an inter-pole crossover wire extending between one end and another end of the multi-phase winding in an axial direction of the multi-phase winding, the inter-pole crossover wire extending through one of the plurality of slots that is between two adjacent poles of the plurality of magnetic poles; and
- an end crossover wire extending in the circumferential direction on the other end of the multi-phase winding;

the inter-pole crossover wire of each crossover wire includes:
- one inter-pole crossover wire that extends from a winding finish portion of one of the two same-phase single coils; and
- one inter-pole crossover wire that extends from a winding start portion of another of the two same-phase single coils; and the plurality of slots include:
- a slot in which none of the inter-pole crossover wires is arranged,
- a slot in which one of the inter-pole crossover wires is arranged; and
- a slot in which two of the inter-pole crossover wires are arranged to cross each other.

* * * * *